US009563274B2

(12) United States Patent
Senanayake et al.

(10) Patent No.: US 9,563,274 B2
(45) Date of Patent: Feb. 7, 2017

(54) ADAPTABLE INPUT/OUTPUT DEVICE

(75) Inventors: Rukman Senanayake, San Jose, CA (US); Grit Denker, Palo Alto, CA (US); Patrick D. Lincoln, Woodside, CA (US); Roy D. Kornbluh, Palo Alto, CA (US); Sierra J. Lincoln, Woodside, CA (US); Richard P. Heydt, Palo Alto, CA (US); Harsha Prahlad, Cupertino, CA (US); Daniel McConnell Aukes, Redwood City, CA (US); Karl D. van Dyk, Placerville, CA (US); Geoffrey A. Mangus, Hollister, CA (US); Joseph S. Eckerle, Woodside, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 1122 days.

(21) Appl. No.: 13/158,122

(22) Filed: Jun. 10, 2011

(65) Prior Publication Data
US 2012/0313857 A1 Dec. 13, 2012

(51) Int. Cl.
*G06F 3/01* (2006.01)
*G06F 3/02* (2006.01)
*G06F 3/041* (2006.01)

(52) U.S. Cl.
CPC .............. *G06F 3/016* (2013.01); *G06F 3/0202* (2013.01); *G06F 3/041* (2013.01)

(58) Field of Classification Search
CPC ......... G06F 3/016; G06F 3/0202; G06F 3/041
See application file for complete search history.

(56) References Cited

U.S. PATENT DOCUMENTS

| 6,819,312 | B2 * | 11/2004 | Fish .............................. 345/156 |
| 7,277,080 | B2 * | 10/2007 | Goulthorpe ................... 345/108 |
| 8,232,976 | B2 * | 7/2012 | Yun et al. ...................... 345/173 |
| 8,390,594 | B2 * | 3/2013 | Modarres et al. ............ 345/174 |
| 2005/0030292 | A1 * | 2/2005 | Diederiks ...................... 345/173 |
| 2009/0250267 | A1 * | 10/2009 | Heubel et al. ............. 178/18.03 |
| 2011/0107958 | A1 | 5/2011 | Pance et al. |
| 2011/0157090 | A1 | 6/2011 | Parihar |

* cited by examiner

*Primary Examiner* — Lun-Yi Lao
*Assistant Examiner* — Ibrahim Khan
(74) *Attorney, Agent, or Firm* — Barnes & Thornburg LLP

(57) ABSTRACT

The present invention relates to an adaptable input/output device. One embodiment of a hardware device for facilitating an interaction between a computing system and a user includes: an interaction surface for supporting the interaction, a single actuator capable of driving a first region of the interaction surface, and a first selective clamping mechanism capable of restricting movement of one or more second regions of the interaction surface that partly intersect the first region, wherein a displacement of one or more desired portions of the interaction surface is dynamically controllable.

46 Claims, 21 Drawing Sheets

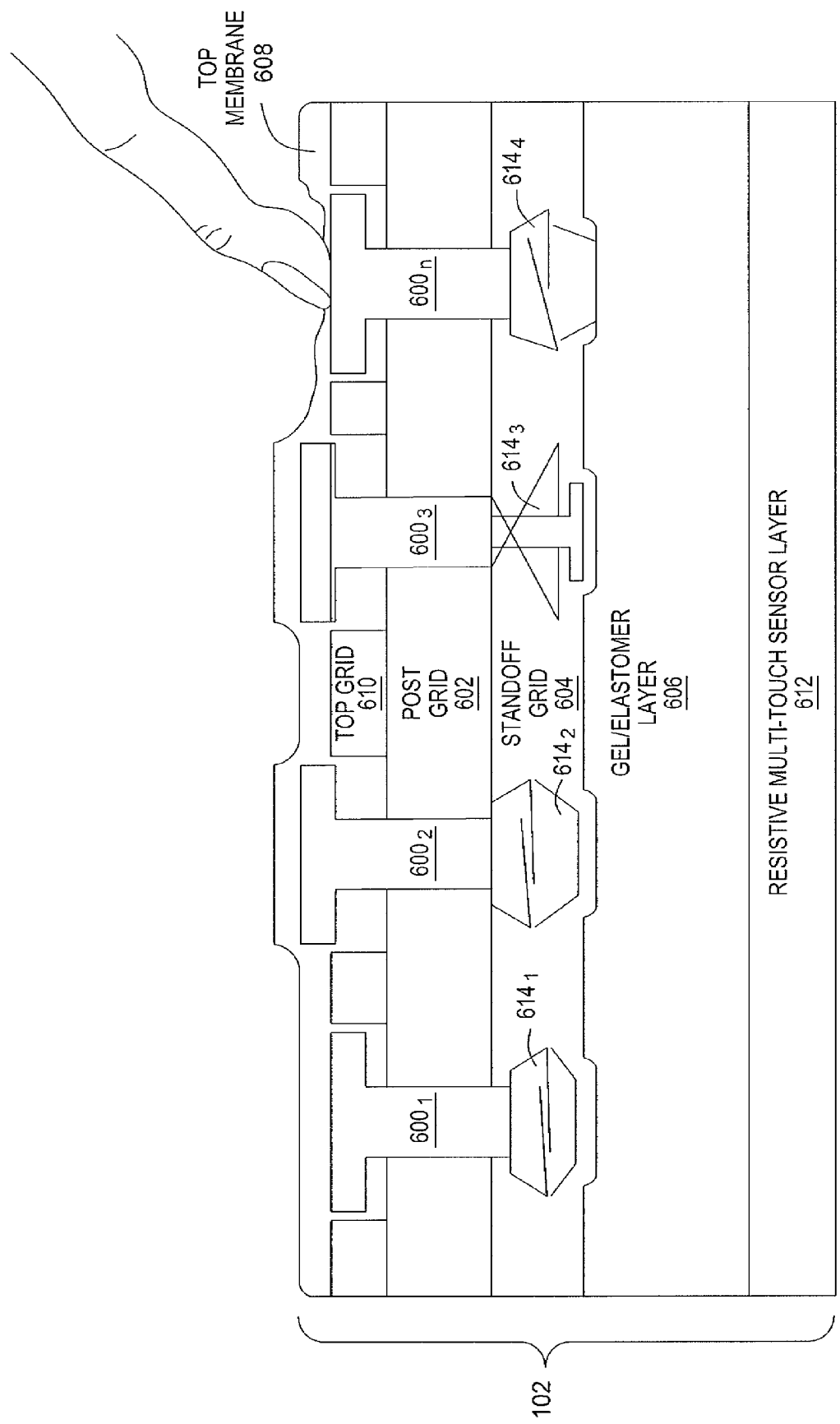

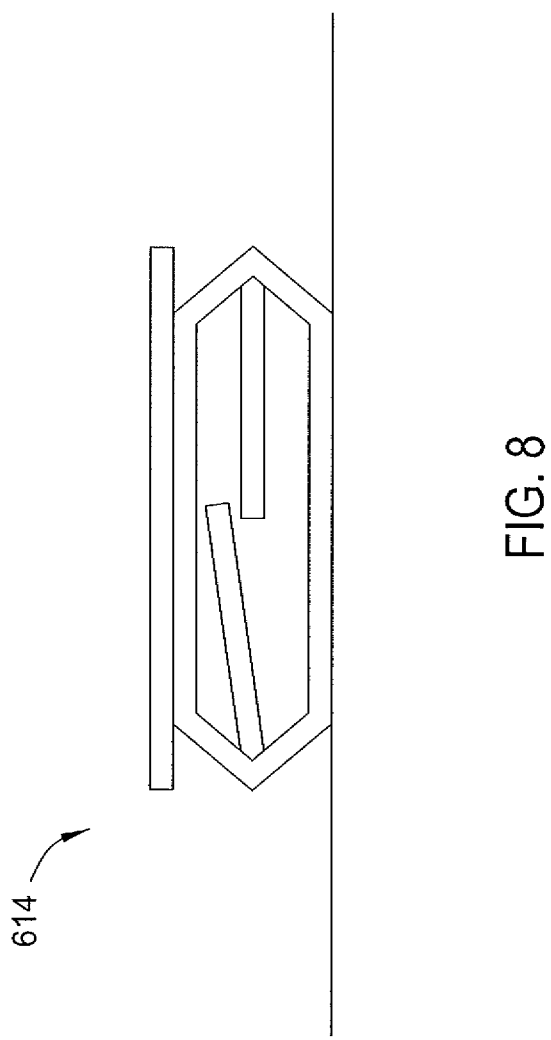

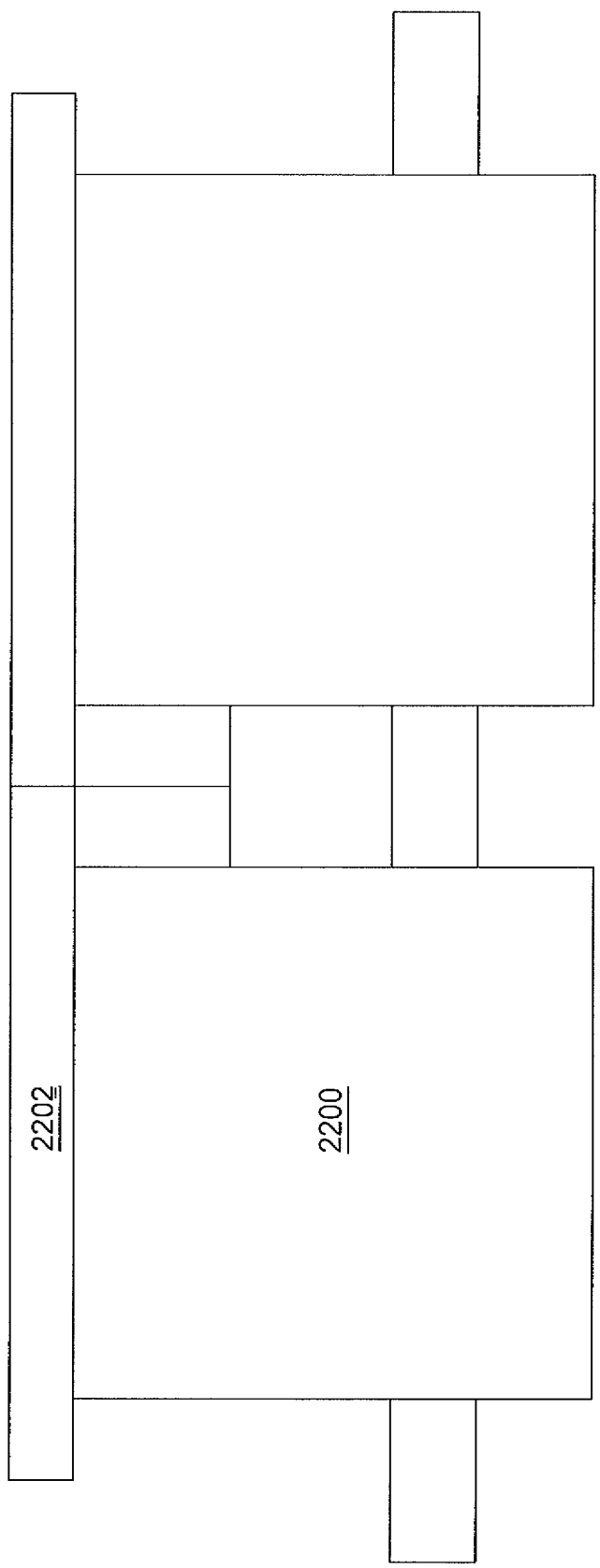

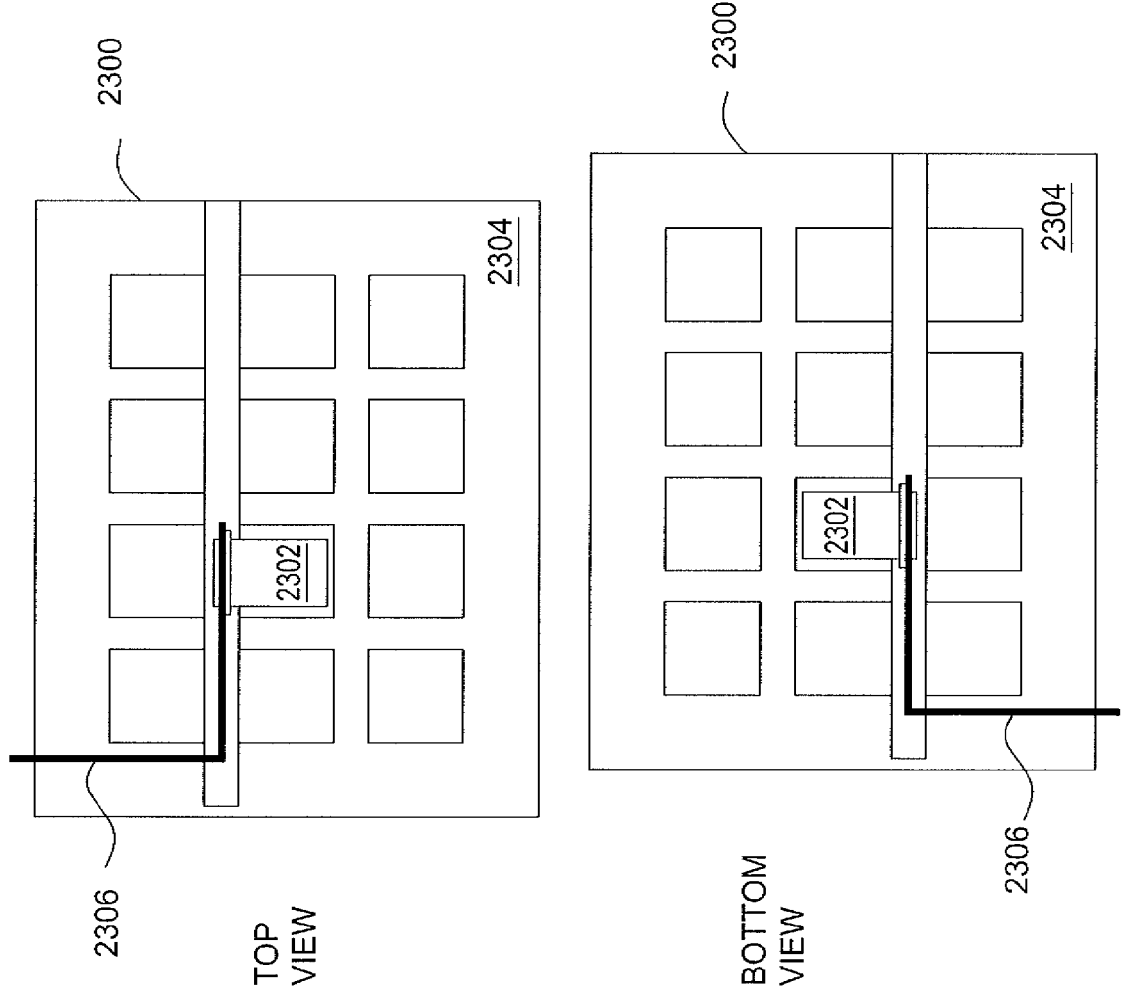

ADAPTABLE INPUT/OUTPUT DEVICE

FIELD OF THE INVENTION

The present invention relates generally to devices technology for interacting with computer systems (or other electronic devices with computational abilities such as electronic instruments, microprocessor controlled displays, or the like), and relates more particularly to input/output devices used with computer systems.

BACKGROUND OF THE DISCLOSURE

Conventional input/output (I/O) devices such as keyboards and mice do not adapt to an end user's needs or working habits in the sense that the I/O devices typically cannot adjust their physical shape in response to the user's interactive context. For example, while the functionality associated with particular keys on a conventional computer keyboard can be reassigned by software to a variety of different functions, the conventional keyboard remains a keyboard: it is not designed or enabled to dynamically change shape and transform (e.g., into a joystick) in response to the current usage context Moreover, conventional I/O devices tend to occupy a significant amount of the user's available working space; thus, a keyboard may compete and conflict with a display over limited surface area. The space conflict is especially problematic when dealing with portable computing devices (e.g., laptop computers, personal digital assistants, and the like). Furthermore, while the various regions of a touch-enabled display screen can be dynamically reassigned to different functions, the physical shape of the display screen is conventionally fixed and remains a substantially flat surface. This results, among other limitations, in little or no meaningful tactile feedback for the user, and is less than optimal for many interactive applications.

Existing or proposed displays that can change shape out-of-plane (e.g., Braille displays) generally rely on individual actuators to control the out-of-plane position of individual display elements. This approach entails a large number of actuators, has performance limitations, and can be complex, unreliable, and costly.

SUMMARY OF THE INVENTION

The present invention relates to an adaptable input/output device. One embodiment of a hardware device for facilitating an interaction between a computing system and a user includes: an interaction surface for supporting the interaction, a single actuator capable of driving a first region of the interaction surface, and a first selective clamping mechanism capable of restricting movement of one or more second regions of the interaction surface that partly intersect the first region, wherein a displacement of one or more desired portions of the interaction surface is dynamically controllable.

In another embodiment, a hardware device for facilitating an interaction between a computing system and a user includes: an adaptable surface for supporting the interaction, the adaptable surface being dynamically deformable under a control of the computing system so as to produce a deformation, a controllable clamping mechanism capable of varying a resistance of the deformation to movement in response to a pressure applied by the user, and circuitry for transmitting an input signal to the computing system responsive to the pressure.

In another embodiment, a hardware display device for facilitating an interaction between a computing system and a user includes an adaptable surface for supporting the interaction, the adaptable surface being dynamically deformable under a control of the computing system so as to produce a deformation that substantially mimics an appearance associated with an input device, wherein the deformation is further deformable under a user-applied pressure to assume a shape that substantially mimics the input device when pressed, and circuitry for transmitting an input signal to the computing system in response to the user-applied pressure.

BRIEF DESCRIPTION OF THE DRAWINGS

The teachings of the present invention can be readily understood by considering the following detailed description in conjunction with the accompanying drawings, in which:

FIG. 6 is a schematic diagram illustrating a cross-sectional view of one embodiment of the polymorphic layer illustrated in FIG. 1;

FIG. 8 illustrates a close-up view of the selector mechanism illustrated in FIG. 6;

FIG. 22 is a schematic diagram illustrating a grid element of a polymorphic surface in which a display tile is integrated; and FIG. 23 is a schematic diagram illustrating one embodiment of a grid element array incorporating selector mechanisms such as those illustrated in FIG. 7C.

To facilitate understanding, identical reference numerals have been used, where possible, to designate identical elements that are common to the figures.

DETAILED DESCRIPTION

The present invention relates to an adaptable input/output (I/O) device. Embodiments of the present invention replace the conventional keyboard and mouse combination (or other X-Y I/O device such as a track pad, touch screen, or track ball) with a single I/O device (e.g., a flat display) that can dynamically adapt its appearance and structure in response to changing use contexts. Adaptation of the adaptable I/O device may be based on triggers including the user's hand position, the user's gestures, active applications, active input fields, and display configuration, among others.

Figure 1:
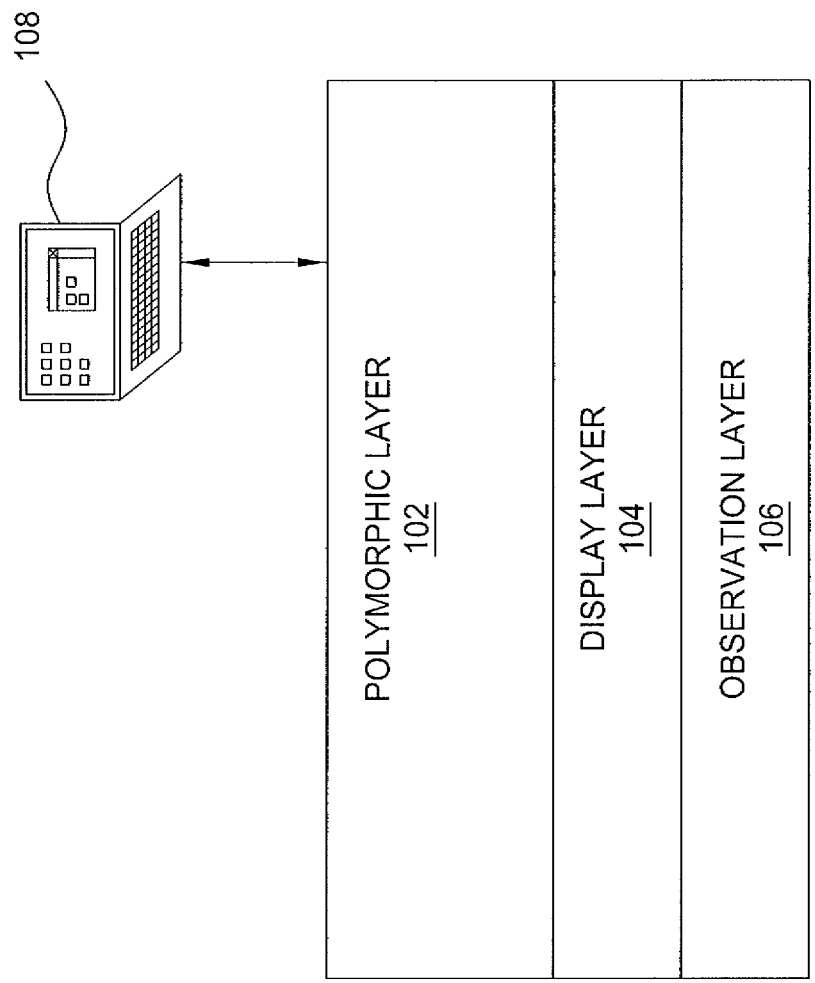
FIG. 1 is a schematic diagram illustrating one embodiment of a hardware device for facilitating interactions between a user and a computing system, according to the present invention.

FIG. 1 is a schematic diagram illustrating one embodiment of a hardware device 100 for facilitating interactions between a user and a computing system, according to the present invention. The device 100 may operate as a stand-alone computing device (i.e., the device 100 may incorporate or be incorporated into the computing system), or the device 100 may be coupled to a separate computing system 108. The computing system may be, for example, a personal computer, a tablet computer, a cellular telephone, a smart phone, a gaming console, a handheld gaming device, a set top box, an Internet ready television, a computer-controlled machine such as a robot or vehicle, or the like. The device 100 may also be an adaptable display (not facilitating user input itself), where computation enables the device 100 to achieve desired three-dimensional surface configurations as directed by the computing system). The device 100 illustrated in FIG. 1 is generalized in order to illustrate the basic components of the present invention.

As illustrated, one embodiment of the device 100 generally comprises three layers: a polymorphic layer 102, a display layer 104, and an observation layer 106. The three layers cooperate in order to interact with a user in a manner that adapts to changing use contexts.

The polymorphic layer 102 comprises a planar or non-planar interaction surface that provides a tactile interface through which the user can provide inputs to the device 100 and, consequently, the computing system. Additionally, the device 100 may use the polymorphic layer 102 to provide tactile output to the user. To this end, the surface of the polymorphic layer 102 is adaptable; that is, the surface of the polymorphic layer 102 is capable of dynamically changing its shape and texture, under the control of the computing system. In one embodiment, the polymorphic layer 102 additionally includes a vibration mechanism. Additionally, the polymorphic layer 102 is preferably transparent, such that the display layer 104, which is positioned beneath the polymorphic layer 102, is viewable through the polymorphic layer 102. Alternatively, in some embodiments, display elements may be positioned over the polymorphic layer 102, as discussed in greater detail below.

In one embodiment, the polymorphic layer 102 is formed of a plastic (e.g., acrylic) three-dimensional transparent micro grid comprising a plurality of grid elements and at least one actuator. The arrangement of the grid elements allows the polymorphic layer 102 to simulate a plurality of different input devices.

In another embodiment, the polymorphic layer 102 comprises a flexible or compliant fabric layer whose shape and texture are locally variable using a plurality of pivoting, lockable joints between rigid elements disposed beneath the fabric layer. In another embodiment, the polymorphic layer 102 comprises a plurality of directionally flexible or compliant fabric layers that clamp together. In yet another embodiment, the polymorphic layer 102 comprises a flexible or compliant fabric layer whose shape, texture, and stiffness are locally variable using a plurality of interwoven strips disposed beneath the fabric layer. As used herein, the term "fabric" may refer to a textile material, or may alternatively refer to a material that incorporates plastics, filaments, metals, and/or mixed materials engineered with appropriate properties.

Specific, exemplary structural embodiments of the polymorphic layer 102 are described in further detail below with respect to FIGS. 5-16.

Figure 2:
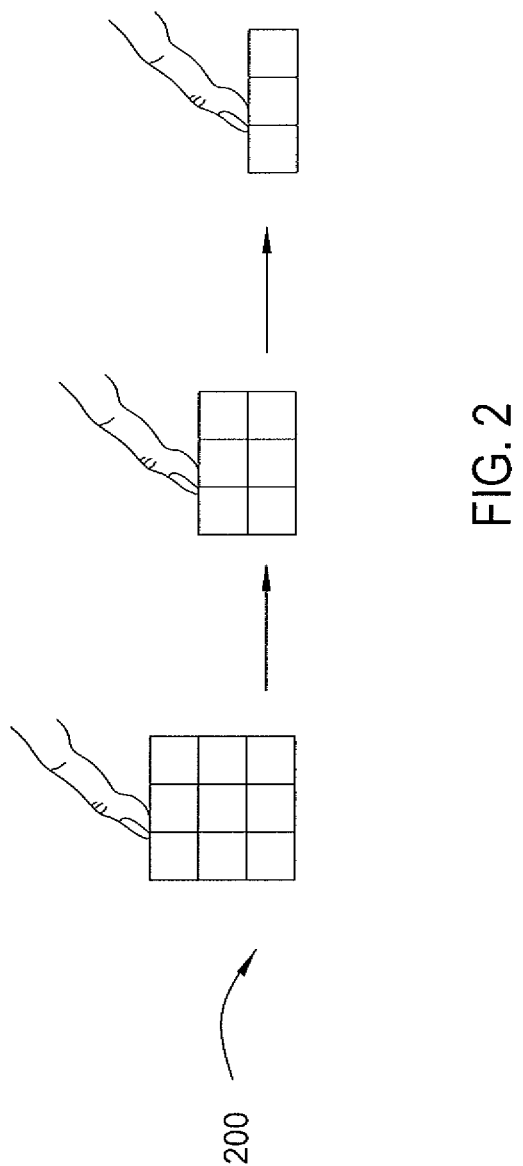
FIG. 2 depicts an exemplary set of grid elements that is elevated to simulate a button or key.

To illustrate an example of the type of input devices that can be simulated by the polymorphic layer 102, FIG. 2 depicts an exemplary set 200 of grid elements that is elevated to simulate a button or key (horizontal lines are shown in FIG. 2 only to help the reader more easily visualize the relative vertical displacement, and are not intended as a depiction of structure). As the user depresses the button or key, the set 200 of grid elements gradually lowers with resistance to the applied pressure to simulate, for example, the response of a button on a conventional mouse or a key on a conventional keyboard. In one embodiment, the resistance of the button or key (i.e., the set 200 of grid elements) to such a user-applied pressure is variable (e.g., using a controllable clamping mechanism, as described in greater detail below). Thus, the set 200 of grid elements does not just simulate a button or key in terms of shape, but also in terms of feel and response.

In further embodiments, the displacement and/or resistance of the set 200 of grid elements can be further controlled using a controllable ratcheting mechanism.

Figure 3:
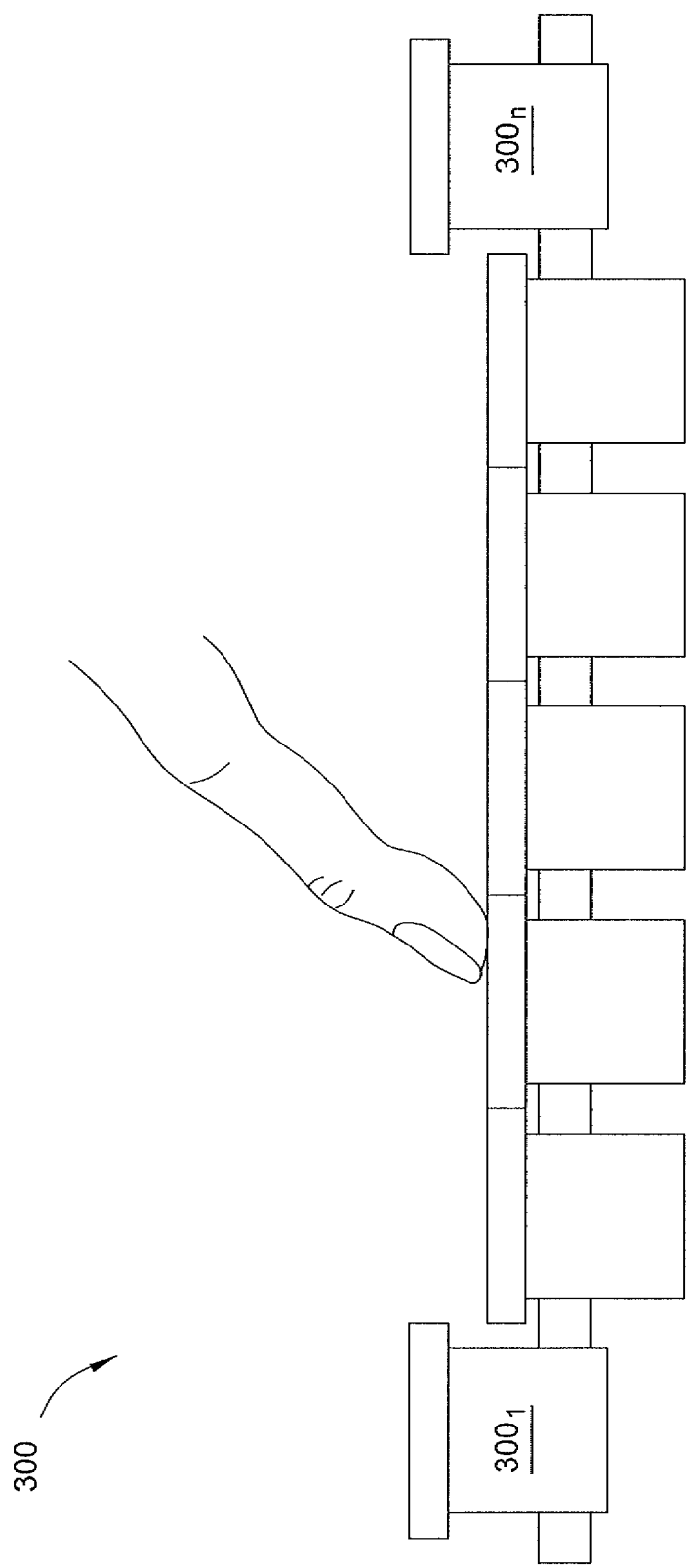
FIG. 3 illustrates an exemplary set of grid elements that is configured to simulate a slider.

It will be appreciated that the set 200 of grid elements is provided as an example only; the grid elements may be actuated to take any form, and the form will vary depending upon the currently active applications and use contexts. For example, FIG. 3 illustrates an exemplary set 300 of grid elements that is configured to simulate a slider. A slider (or scroll bar) is a familiar user input instrumentality, allowing the user to increase or decrease an input parameter value for the computing system, by sliding or dragging the corresponding indicator on the slider. In one embodiment of the present invention, a first grid element $300_1$ gives tactile feedback when the upper limit is reached (i.e., when the user's finger cannot slide the slider to a higher value). Similarly, a second grid element $300_n$ gives tactile feedback when the lower limit is reached (i.e., when the user's finger cannot slide the slider to a lower value). The upper and lower limits of the slider are enforced by clamping the first and second grid elements $300_1$ and $300_n$, which are located at or near the upper and lower edges of the slider, at an elevated position. The user cannot depress the first and second grid elements $300_1$ and $300_n$ when they are clamped in this way. As such, the user can know that a limit has been reached without having to look at the slider. The remaining grid elements in the set 300 of grid elements may be depressed by the user to indicate a current applicable value in the range of the slider; thus, the user can change the input value by dragging his or her finger across the top surface of the remaining grid elements. Additionally, a user interface or graphical element on the display surface will also indicate the value range (including the edges or limits) of the slider.

In other embodiments still, a set of grid elements may be dynamically configured to simulate the look and feel of a different kind of user input device, including at least one of: an alphanumeric keyboard, a telephone-style keypad, a numeric keypad, a media player controller, a joystick, a video game controller, a television-style remote controller, or a vehicle or robot controller. In another embodiment, the polymorphic layer 102 is configured to function as a button for an interactive command for a window displayed on the display surface 104.

The interactive command may comprise, for example "close the window," "minimize the window," "scroll the contents of the window," or the like. In further embodiments still, the polymorphic layer 102 is configured as a topographic terrain map.

Referring back to FIG. 1, the display layer 104 is positioned beneath the polymorphic layer 102 and is viewable through the polymorphic layer 102. The display layer 104 preferably comprises a flat panel display and provides visual output to the user. To this end, the display is capable of changing its appearance under the control of the computing system. In one embodiment, the display layer 104 may serve as the primary display for the computing system. In another embodiment, the display layer 104 provides two main functions. First, the display layer 104 extends a primary display to which the device 100 may be coupled (e.g., the display of computing system 108). This allows the display area to be dynamically adjusted/controlled. Second, the display layer 104 outputs (displays) graphical interfaces or user interfaces associated with the current configuration of the polymorphic layer 102 (e.g., a display keyboard, a touchpad, or the like). The display layer 104 may comprise, for example, a plasma, liquid crystal, or light emitting diode display.

Figure 4:
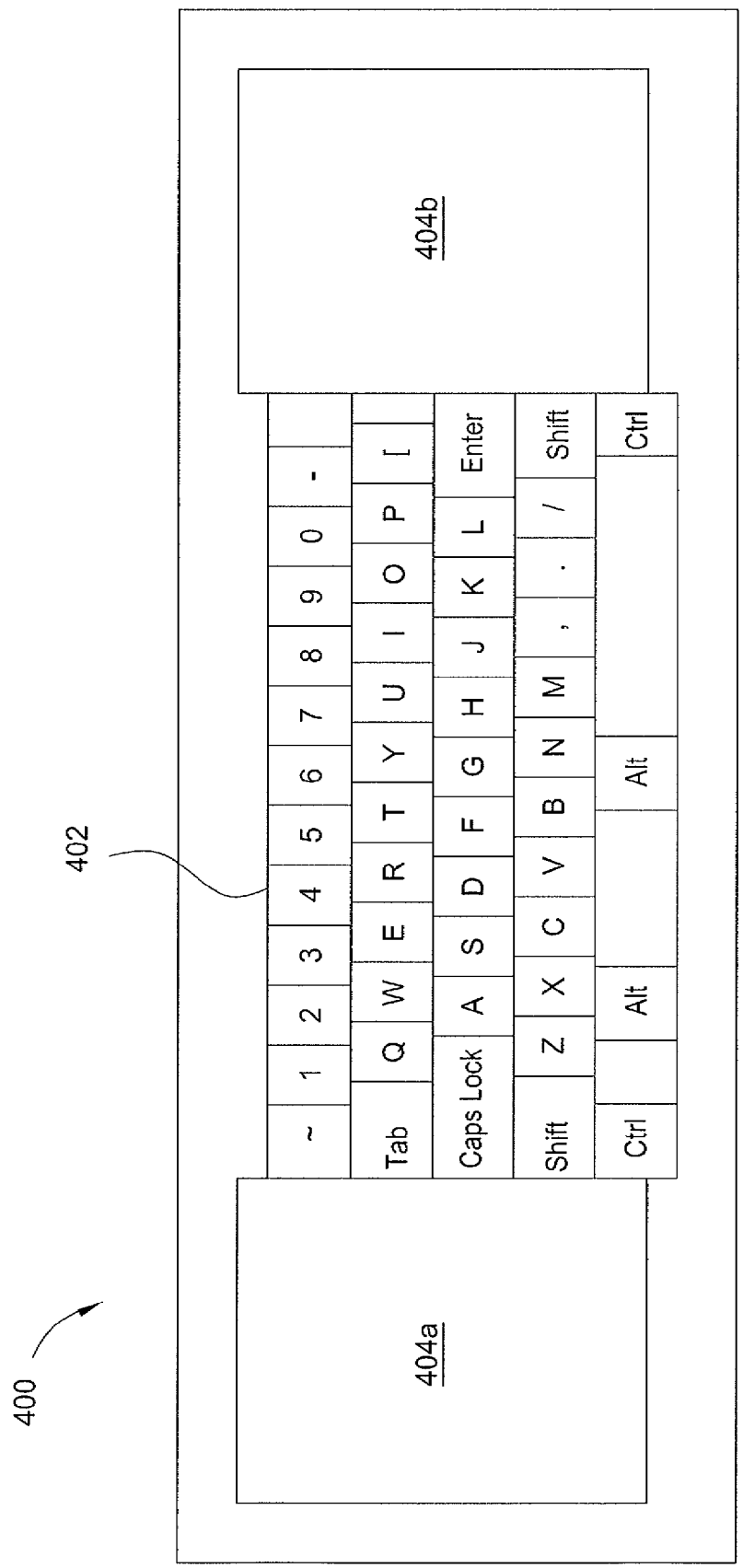
FIG. 4 illustrates an exemplary user interface that can be displayed on the display layer.

FIG. 4, for example, illustrates an exemplary user interface instrumentality (or "widget") 400 that can be displayed on the display layer 104. The exemplary user interface 400 includes a keyboard 402 and two track pads 404a and 404b (hereinafter collectively referred to as "track pads 404"). The exemplary user interface 400 may be useful, for example, in conjunction with a computing device that uses multiple displays (e.g., a dual monitor display). For example, one track pad could be provided for each display to enable immediate navigation. In a dual monitor display, for instance, use of the exemplary user interface 400 could avoid an approximately five thousand pixel initial positioning movement (if the user must drag the mouse from a first end of a monitor to an opposing second end of the monitor).

The shape and texture of the polymorphic layer 102 is adaptable, under the control of the computing system, to provide the appropriate tactile surface for each of the keys in the keyboard 402 and each of the track pads 404. For example, as discussed above with respect to FIG. 2, a set of grid elements in the location of each displayed key may be elevated to simulate the look and feel of a key that may be pressed by the user. The user interface 400 may be programmable with respect to any of its primary parameters (e.g., language, layout, design, ergonomic factors, colors, sensitivity, and the like). It will be appreciated that the user interface 400 is provided as an example only; the user interfaces displayed on the display layer 104 may take any form and will vary dynamically depending upon the currently active applications and use contexts. For example, the user interface could also be configured as a media player controller or any of the other input devices described above.

Referring back to FIG. 1, the observation layer 106 comprises one or more sensors that observe and track the user's actions with respect to the computing system. In one embodiment, the sensors are arranged in a grid. The sensors may include, for example, cameras (e.g., infrared or visible spectrum micro cameras), capacitive sensors, pressure sensors, or the like. In some embodiments, the observation layer can be an element of a multi-touch sensing system based on Frustrated Total Internal Reflection ("FTIR," a touch-sensing technology known to skilled practitioners in the field). The sensors preferably also enable measurement of the proximity of objects/actions at a distance from the surface—such as stereo and/or multiple cameras that enable the computing system to measure the distance of an object or body part (e.g., finger) from the surface of the device—as discussed in further detail below. Thus, the sensors—in conjunction with the computing system (which analyzes the sensor data)—can preferably observe and track a plurality of actions and movements, including the user's hand position, gestures, and gaze (suitable algorithms for recognizing gestures and the like are familiar to those of skill in the art). In addition, the computing system can also consider the applications that are currently active on the computing system, the input field that is currently active on the computing system, and the current display configuration (e.g., single versus multiple monitor display), along with any of the recognized actions or gestures mentioned above, in order to responsively adapt the polymorphic layer 102 and the display layer 104. In one embodiment, the observation layer 106 includes a network interface that allows the observation layer 106 to exchange data directly with the computing system.

In one embodiment, and as depicted in FIG. 1, the observation layer 106 is positioned beneath the display layer 104. Thus, the display layer 104 is effectively "sandwiched" between the observation layer 106 and the polymorphic layer 102. Particularly in such embodiments, the polymorphic layer 102 is preferably made of a substantially transparent material, to permit a substantially unobstructed view of the display layer 104. However, alternative embodiments are also possible in accordance with the present invention (e.g., the display layer 104 may be implemented on top of the polymorphic layer 102 and/or integrated with the polymorphic layer 102). For instance, the display layer 104 may comprise a plurality of individual miniature display tiles (e.g., liquid crystal display (LCD) tiles) fixed atop a polymorphic surface and able to move with the polymorphic surface; the display layer 104 may then be projected from above onto the polymorphic surface. FIG. 22, for example, is a schematic diagram illustrating a grid element 2200 of a polymorphic surface in which a display tile 2202 is integrated. As discussed above, the display layer 104 may be projected from above onto the display tile 2202 (which may comprise, for example, and LCD or rear projection film). Thus, the multi-layer "sandwich" embodiment illustrated in FIG. 1 is shown purely for illustrative purposes. As a further example, the observation layer 106 need not consist of a single physical layer, and instead may include sensors that are physically positioned in various locations relative to the display layer 104 and the polymorphic layer 102.

Thus, the various layers of the device 100 cooperate to provide a variety of user interfaces, responsive to dynamically changing use contexts. For instance, the device 100 can simulate an alphanumeric keyboard (whose key position may or may not be adjustable), a computer mouse, a track ball, a track pad, a scratch pad, a track point, a bass-relief sculpting toy (e.g., using the display to visually emphasize shapes that are "carved" by the user's fingers), a potter's wheel (e.g., using a tactile "line" to act as a lathe upon a rotationally symmetric solid), a musical instrument (e.g., using a tactile set of "strings" that move past the user's fingers under pressure), a set of finger paints, or any of the other previously described user input devices.

Figure 5:
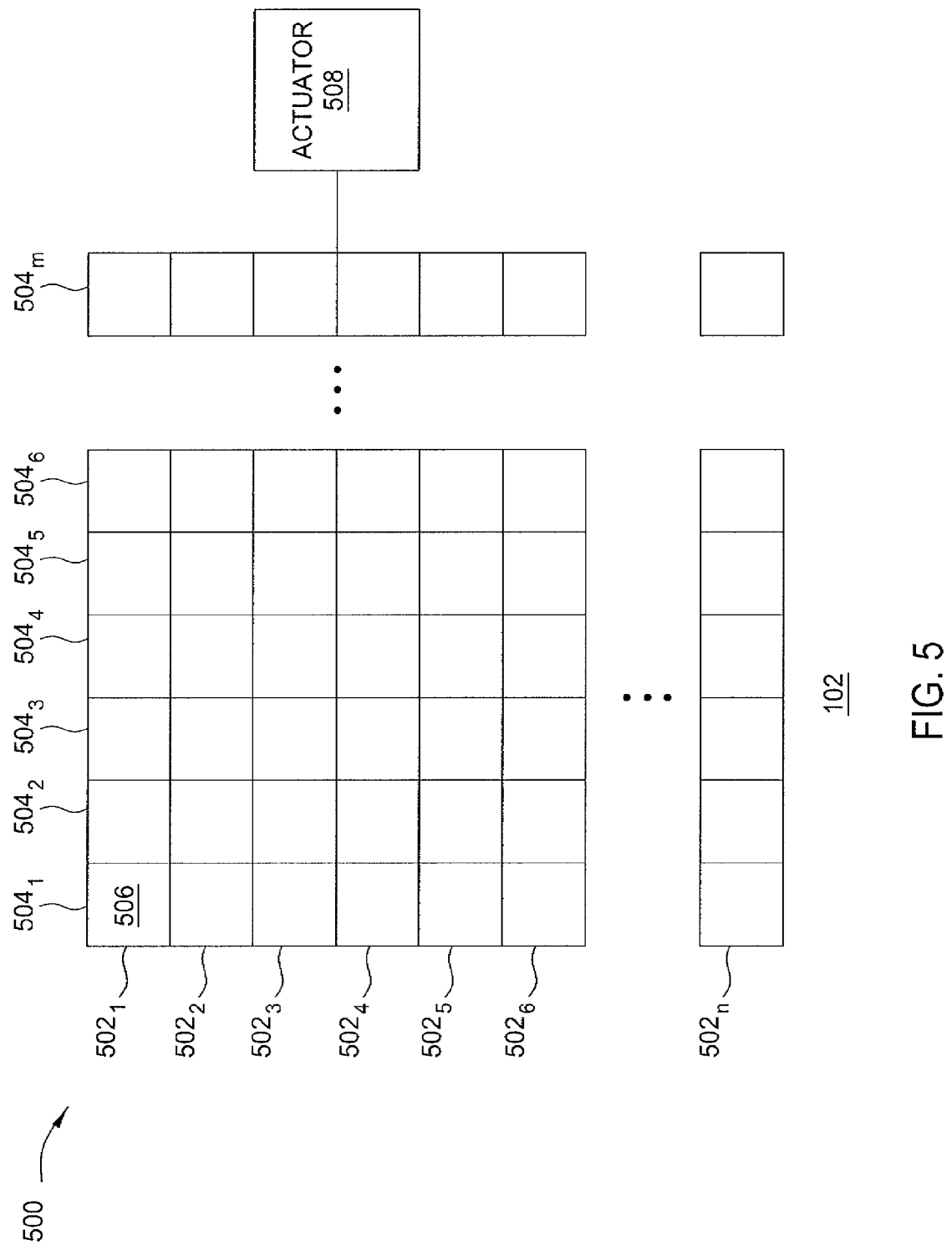
FIG. 5 is a schematic diagram illustrating a top view of one embodiment of the polymorphic layer, according to the present invention

FIG. 5 is a schematic diagram illustrating a top view of one embodiment of the polymorphic layer 102, according to the present invention. As discussed above, in an illustrative embodiment, the polymorphic layer 102 may be formed of a plastic (e.g., acrylic) three-dimensional transparent micro grid 500 comprising a plurality of grid elements and at least one actuator. As discussed above, the polymorphic layer 102 may be configured in a variety of ways and may be formed from a variety of materials. Thus, FIG. 5 illustrates only one way in which the polymorphic layer 102 may be configured. In addition, the role of the actuator may be performed by human activity or another environmental force which acts upon the grid elements. For example, a person can press down on the grid elements or rotate the display so that gravity acts on the grid elements.

In one embodiment, the grid elements are arranged in a plurality of intersecting rows $502_1$-$502_n$ (hereinafter collectively referred to as "rows 502") and columns $504_1$-$504_m$ (hereinafter collectively referred to as "columns 504"). Thus, a grid element is positioned at each intersection of a row 502 and column 504. For ease of illustration, only a single grid element 506 is numbered in FIG. 5, at the intersection of row $502_1$ and column $504_1$. Grid elements are generally referred to as "grid elements 506" hereinafter.

At least one actuator 508 is coupled to the grid 500. In one embodiment, the actuator 508 is a substantially global actuator. That is, the actuator 506 is capable of driving a plurality of the grid elements 506; thus, an individual actuator is not needed to drive each grid element 506. In one embodiment the actuator 508 drives substantially all of the grid elements 506. In another embodiment, a plurality of actuators 508 is deployed, such that each actuator 508 drives a particular localized region or group of grid elements 506. In yet another embodiment, a plurality of actuators 508 is deployed, such that each actuator 508 drives at least one row 502 or at least one column 504. For example, each row 502 or each column 504 may be driven by a dedicated actuator 508.

Each grid element 506 is capable of being displaced or elevated to multiple heights by its associated actuator 508, for example using air pressure or electromechanical actuation (such as a solenoid). Thus, the actuator 508 drives the grid elements 506 in a direction that is substantially normal to the interaction surface of the polymorphic layer 102.

One embodiment of a polymorphic layer 102 additionally includes at least one selective or substantially local clamping mechanism. A selective clamping mechanism controls the displacement of a specific grid element 506 (or group of grid elements 506) by the actuator 508. FIGS. 6-10 illustrate embodiments of various clamping mechanisms that may be used. For simplicity's sake, the actuator or reset mechanism is not illustrated in these Figures.

FIG. 6, for example, is a schematic diagram illustrating a cross-sectional view of one embodiment of the polymorphic layer 102 illustrated in FIG. 1. As discussed above, the polymorphic layer 102 may be configured in a variety of ways and may be formed from a variety of materials. Thus, FIG. 6 illustrates only one way in which the polymorphic layer 102 may be configured.

Generally, the polymorphic layer 102 illustrated in FIG. 6 uses electrostatic clamping to control the displacement of individual grid elements 506. This allows greater control over smaller regions of the polymorphic layer 102 while requiring little power to operate. Moreover, this approach is compatible with both force-based touch screen and frustrated total internal reflection (FTIR) devices.

As illustrated, the polymorphic layer 102 generally comprises a plurality of posts $600_1$-$600_n$ (hereinafter collectively referred to as "posts 600"), where each post is positioned beneath a grid element 506 or group of grid elements 506. The displacement of each of the posts 600 (and corresponding grid elements 506) is controllable using an electrostatic selector mechanism $614_1$-$614_n$ (hereinafter collectively referred to as "selector mechanisms 614"). The posts 600 and selector mechanisms 614 are positioned within several layers of material, including: a post grid 602, a standoff grid 604, and a gel/elastomer layer 606. Optionally, the layers of material may additionally include one of more of: a top membrane 608, a top grid 610, and a resistive multi-touch sensor layer 612. The spaces between the various layers may be filled with a gel or liquid having a refractive index that matches a refractive index of the various layers. In an alternative embodiment, all of the layers are themselves compliant or flexible materials so that the resulting structure is also compliant and flexible (and all elements may have closely matching indices of refraction).

Each post 600 (and, by association, each grid element 506) can be displaced by an amount that is selected from among a plurality of non-zero amounts. FIG. 6 in particular illustrates three different displacements or positions: neutral (i.e., not activated, as illustrated by the post $600_n$), raised (i.e., activated, as illustrated by the posts $600_2$ and $600_3$), and selected (i.e., raised and subsequently pressed by a user, as illustrated by the post $600_n$). Each of the posts 600 is moveable to one of these positions by activating the actuator 508 illustrated in FIG. 5 to drive the post 600, and then activating an associated selector mechanism 614 that is coupled to the post 600 to control the amount by which the post 600 is driven. The selector mechanisms 614 are spring loaded to allow vertical movement of the posts 600.

The selector mechanisms 614 may take a variety of forms; two of these forms are illustrated in FIG. 6. In one embodiment, the selector mechanism 614 is a collapsible mechanism that expands when the associated post 600 is raised and contracts when the post 600 is lowered or when the post 600 is raised and subsequently selected (e.g., by the user pressing down on the post 600). The collapsible mechanism may include for example, an elastomeric carrier membrane positioned between a pair of living hinges. The elastomeric carrier membrane provides a spring load. This embodiment is illustrated by the selector mechanisms $614_1$, $614_2$, and $614_n$.

In another embodiment, the selector mechanism 614 is a trap door mechanism comprising a counter post that biases two overlapping, electrostatically clamped leaves. The leaves rise with the post 600 and lower or flatten when the post 600 is lowered or when the post 600 is raised and subsequently selected. This embodiment is illustrated by the selector mechanism $614_3$ and relies on the compliance of the gel/elastomer layer 606 below. This embodiment is illustrated in more detail in FIGS. 7A-7C, which illustrate various embodiments of a trap door-like selector mechanism.

Figure 7A:
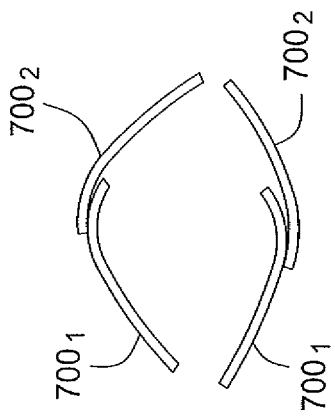
FIGS. 7A-7C illustrate various embodiments of a trap door-like selector mechanism.

FIG. 7A, for example, illustrates a selector mechanism 614 comprising two overlapping, electrostatically clamped leaves $700_1$ and $700_2$ (hereinafter collectively referred to as "leaves 700"). The leaves 700 may comprise, for example, a dielectric material layered over a transparent electrode (e.g., an indium tin oxide or electrostatic discharge polymer electrode). An example of a dielectric material that may be suitable for electrostatic clamping is polyurethane, such as Deerfield PT 6100S polyurethane. An example of a transparent electrostatic discharge (antistatic) polymer is AM Corp. 3M 40 antistatic tape. Electrostatic clamping is achieved when the leaves touch each other and a voltage differential exists between the electrodes on each leaf. The dielectric material on either or both leaves maintains the voltage differential. Electrostatic clamping technology is familiar to those of skill on the art (See, e.g., U.S. Pat. No. 7,598,651).

Figure 7B:
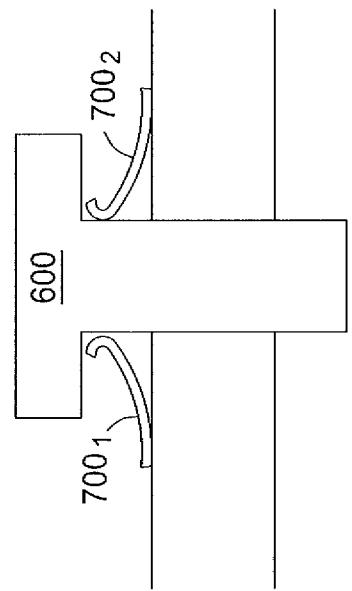

In another embodiment illustrated in FIG. 7B, the leaves 700 are flexible, so that they can better conform to each other and better lock under pressure. In the illustrated embodiment, the leaves 700 form an arch that demonstrates bistable ability similar to a passive dome switch. However, flexible leaves 700 may also be utilized in a manner that does not form an arch.

Figure 7C:
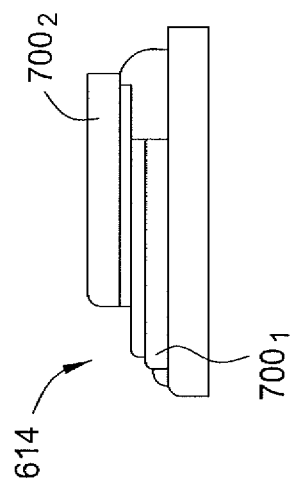

In another embodiment illustrated in FIG. 7C, the leaves 700 lock in a "downward" position when the electrostatic clamping is applied after the associated post 600 is pressed down by a user, eliminating the need for the latching to counter the force of the press. The post 600 can be pressed further downward to activate a switch, enable FTIR detection, or other touch-based or proximity-based (e.g., using capacitance to measure a conductive surface in close proximity to another surface) detection.

Figure 7D:
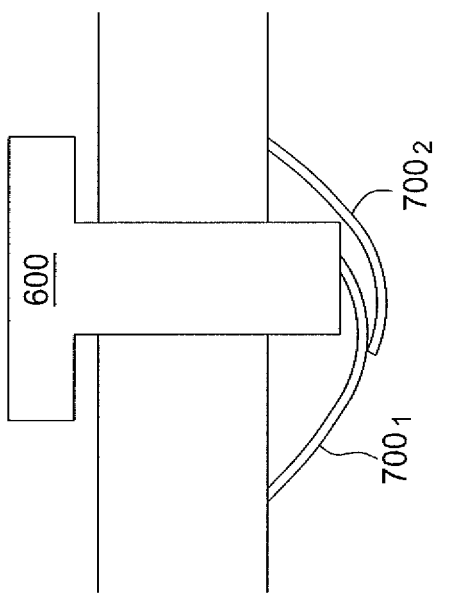
FIG. 7D illustrates an alternative selector mechanism.

FIG. 7D illustrates an alternative selector mechanism. In this embodiment, the leaves 700 clamp directly to the associated post 600. The flexibility of the leaves 700 allows the post 600 to be pressed downward (and to exhibit some non-linear spring forces similar to a dome switch). The post 600 can be pressed further downward to activate a switch, enable FTIR detection, or other touch-based or proximity-based detection.

"Self-locking" designs for clamps, brakes, and similar mechanisms are familiar to practitioners of skill in the art. The above clamping mechanisms can benefit from self-locking designs, in some embodiments, such that the force of a person pressing acts to further press together and confirm the leaves 700. In this way, a post can be further depressed without causing the clamping to slip.

FIG. 23 is a schematic diagram illustrating one embodiment of a grid element array 2300 incorporating selector mechanisms such as those illustrated in FIG. 7C. In particular, the leaves 2302 are affixed to a grid plate 2304, which provides electrical connections. The grid plate 2304 includes a plurality of apertures, each aperture housing a pair of leaves 2302. For ease of illustration, only single pair or leaves 2302 (and a single electrical connection 2306) is illustrated. Multiple grid plates such as the grid plate 2304 may be stacked and aligned with the various layers of the adaptable I/O device 100.

FIG. 8 illustrates a close-up view of the selector mechanism 614 illustrated in FIG. 6. As illustrated in FIG. 8, the posts 600 are removed completely, and the selector mechanisms 614 in essence become both the posts and the selector mechanism.

Figure 9B:
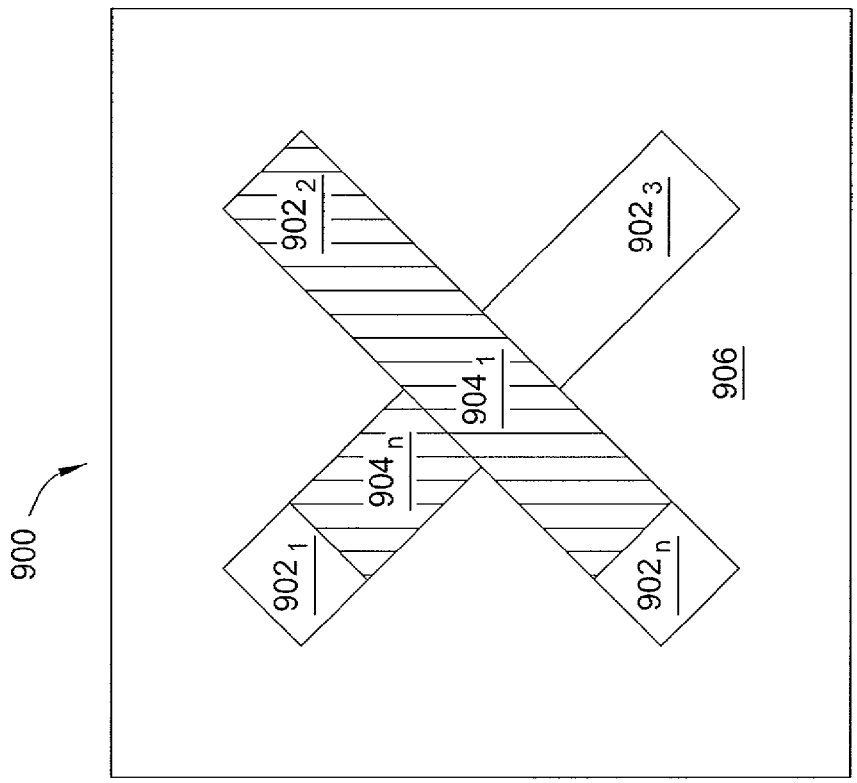
FIGS. 9A-9B illustrate another alternative embodiment of the selector mechanism illustrated in FIG. 6.
Figure 9A:
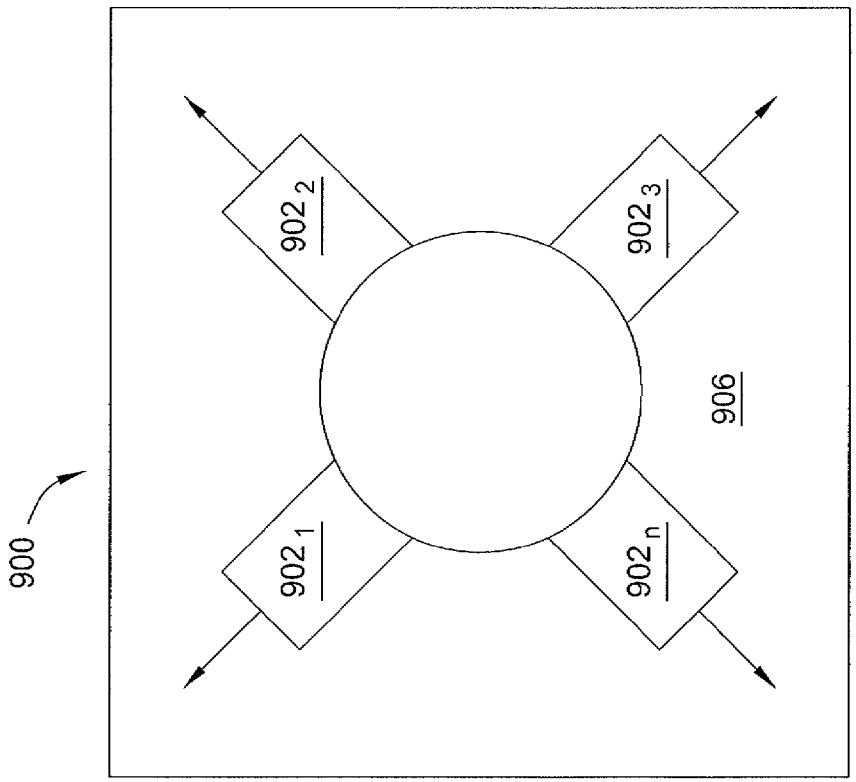

FIGS. 9A-9B illustrate another alternative embodiment of the selector mechanism 614 illustrated in FIG. 6. In particular, FIGS. 9A-9B illustrate a selector mechanism 900 that is configured as a dome switch. In FIG. 9A, the dome switch comprises a transparent plastic dome switch having a plurality of wings $902_1$-$902_n$ (hereinafter collectively referred to as "wings 902"). When the dome switch is depressed, the wings 902 move outward as illustrated by the arrows. The wings 902 may also be clamped to an underlying layer 906 so that the switch requires greater pressure to depress. As with the other selector mechanisms illustrated in FIGS. 6 and 8, if the pressure is applied by a global actuator to depress all of the switches, then a clamped dome switch would tend to extend higher than the unclamped switches.

In FIG. 9B, the wings 902 include overlapping sliding electrolaminate scales $904_1$-$904_n$ (hereinafter collectively referred to as "scales 904"). The scales 904 allow the dome switch to be locked in a depressed position. As described above with reference to FIG. 2, the adjustment of the clamping of these dome switches or other selector mechanisms may also be done while the user is pressing the button, post, or switch. In this manner, the feel of the switch can be made to simulate a variety of responses. For example, the familiar "click" feel of a key on a conventional keyboard can be simulated by releasing the clamping as the switch is depressed.

Further embodiments of the polymorphic layer 102 use different types of clamping mechanisms, including other electrically controllable clamping methods such as electrochemically or electrothermally controlled clamping mechanisms, electroactive polymer mechanisms, electromagnetic clamping mechanisms (e.g., using magnetic latching), mechanical clamping mechanisms (e.g., mechanical levers, strings, straps, locking pins, etc. driven by actuators such as electroactive polymers or electromagnetic devices such as solenoids), and ferrofluids (also referred to as "magneto-rheological fluids") or electrorheological fluids.

As discussed above, the chosen clamping mechanism restricts the movement (e.g., vertical displacement) of at least some of the grid elements 506. That is, the clamping mechanism partially counteracts the actuator 508 by controlling the amount by which an associated grid element 506 is displaced by the actuator 508. For example, the actuator 508 and the clamping mechanism may cooperate to ensure that only a selected set of grid elements 506 is elevated at a given time. For instance, activation of the actuator 508 may cause all grid elements 506 in a given row 502 to be elevated, while activation of the clamping mechanism may cause all grid elements 506 in a column 504 intersecting the given row 502 to be held in a non-elevated position.

Figure 10:
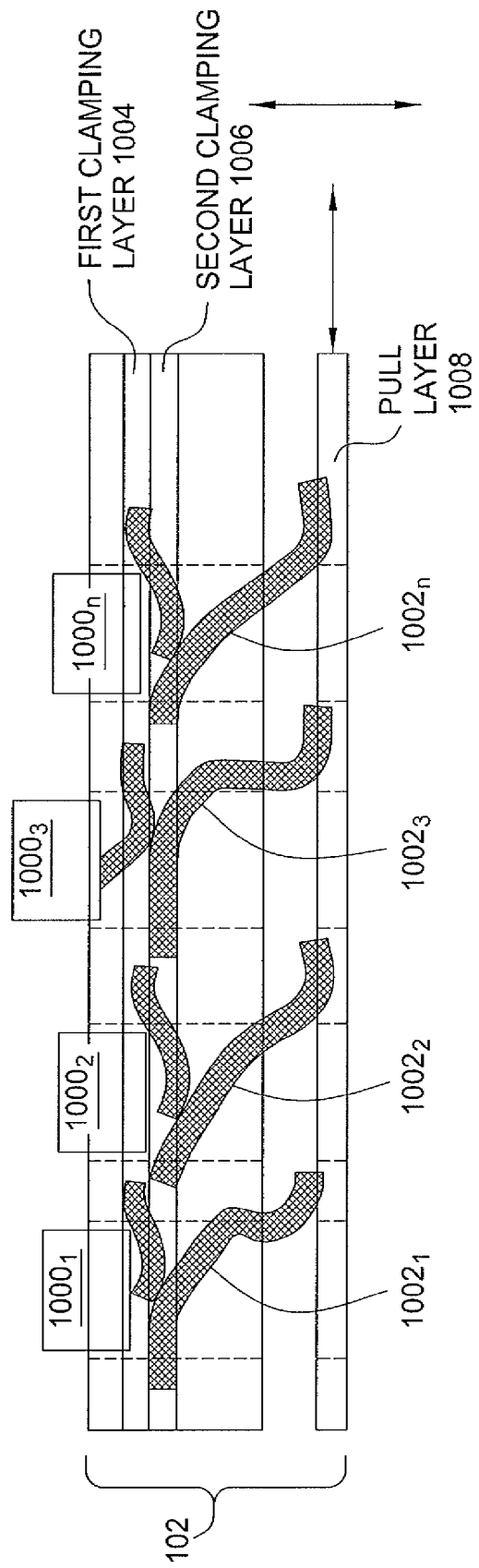
FIG. 10 is a schematic diagram illustrating a cross-sectional view of another embodiment of the polymorphic layer illustrated in FIG. 1.

FIG. 10 is a schematic diagram illustrating a cross-sectional view of another embodiment of the polymorphic layer 102 illustrated in FIG. 1. As illustrated, the polymorphic layer 102 generally comprises a plurality of posts of buttons $1000_1$-$1000_n$ (hereinafter collectively referred to as "buttons 1000"), where each button 1000 is positioned beneath a grid element 506 or group of grid elements 506. The buttons 1000 are clamped in place associated latches $1002_1$-$1002_n$ (hereinafter collectively referred to as "latches 1002"), where each latch 1002 comprises a pair of leaves that clamp together.

The upper leaf of each latch 1002 clamps to a first clamping layer 1004, while the lower leaf of each latch 1002 clamps to a second clamping layer 1006 located below the first clamping layer 1004. Additionally, the lower leaf clamps to a pull layer 1008 located below the second clamping layer 1006. The pull layer 1006 is movable in both the horizontal and vertical directions.

The displacement of each of the buttons 1000 (and corresponding grid elements 506) is controllable using the latches 1002. As described above, the buttons 1000 may be held in a lowered position by clamping the leaves of the associated latches 1002 together. The inclusion of the second clamping layer 1006, which is positioned between the latches 1002 and the pull layer 1006, allows one to control which buttons 1000 are pulled into the lowered position and by what amount the buttons 1000 are lowered. Greater variations in the displacement of the buttons 1000 can be achieved using "inchworming" (i.e., repeated back and forth, horizontal motion of the pull layer 1008), which alternates the clamping between the leaves of the latches 1002 that act between the first and second clamping layers 1004 and 1006 and the lower leaf clamps acting on the pull layer (thereby pulling down or pushing up on the upper leaves). The pull layer 1008 may be moved by the global actuator 508. In this case, the global actuator 508 can move back and forth in small increments and enable the use of additional small-amplitude actuation technologies such as piezoelectrics or microelectromechanical systems (MEMS) electrostatic actuators.

Figure 21:
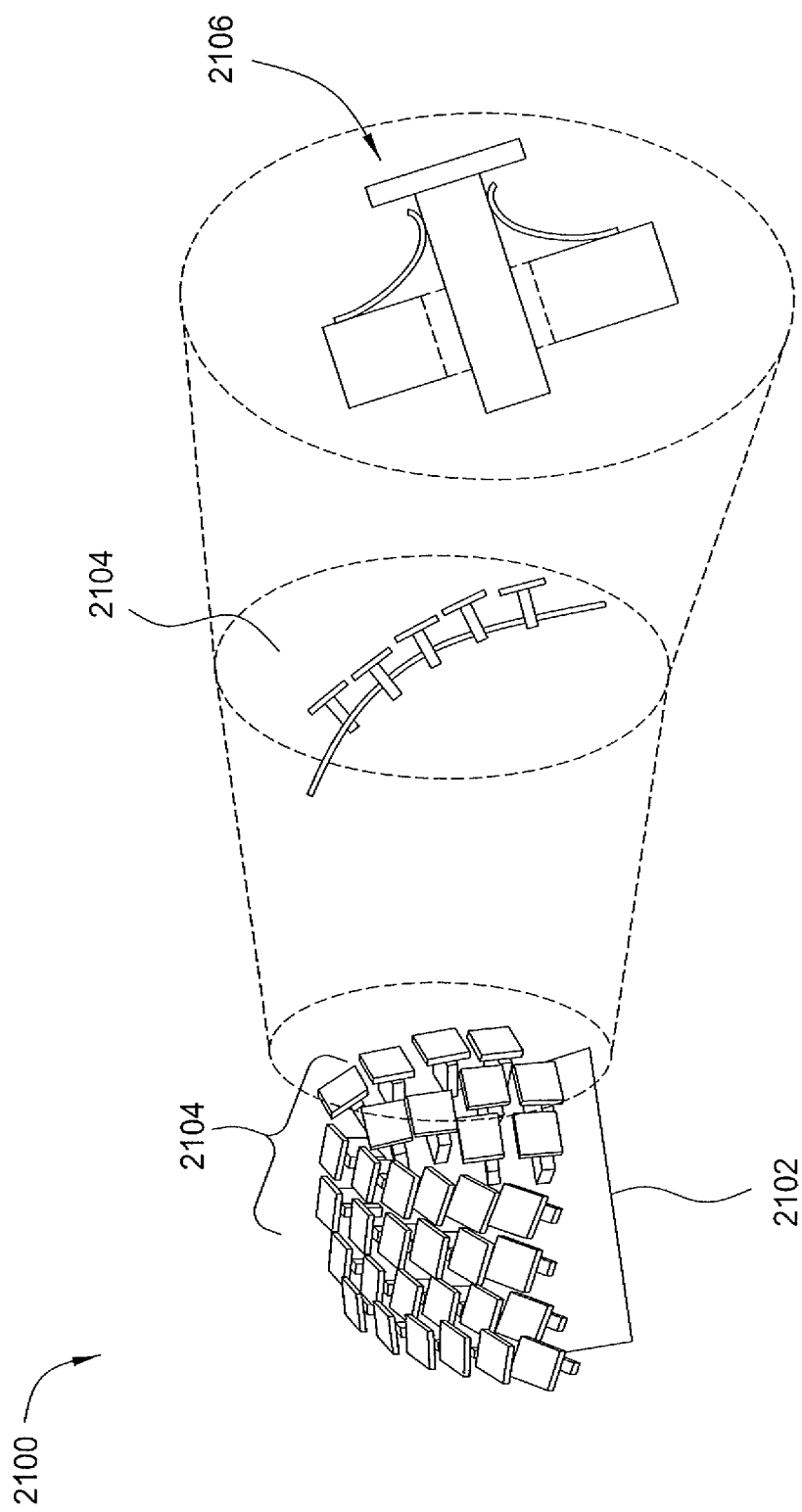
FIG. 21 is an exploded view illustrating a portion of adaptable input/output device having a curved surface.

The array of selectively clamped grid elements can be arrayed on a substantially flat surface, but can also be arrayed on curved (or other non-flat) surfaces. For example, FIG. 21 is an exploded view illustrating a portion of adaptable input/output device 2100 having a curved surface. The curved surface may be advantageously used to produce a device in which the polymorphic display dynamically reproduces the shape and feel of three-dimensional curved objects, such as human heads and faces, planetary globes, and pottery vessels. This allows the adaptable input/output device 2100 to take the shape of a human head, human hand, or human face. Thus, conversing users may "shake hands" or view a physical representation of each other through the adaptable input/output device 2100. In one embodiment, for instance, the surface of the adaptable input/output device 2100 roughly takes the shape of a human head or face in its un-deformed form, and then adopts more user-specific features (e.g., size, shape, and placement of the nose, eyes, etc.) when deformed. The surface of the adaptable input/output device 2100 could adapt continuously such that it is "animated" with the represented user's real-time movements, which may directly sensed or indirectly inferred (e.g., by observation using one or more video cameras or by synchronizing mouth movements with detected speech). As one approach, pneumatic or hydraulic actuators may be used in such embodiments, in which a gas or fluid is pumped into an elastic bladder 2102 that is located within the grid plate 2104. Inflation and deflation of this bladder 2102 provide actuation pressure that can be used to raise, lower, or provide the desired reaction force to each grid element button 2106.

Figure 11C:
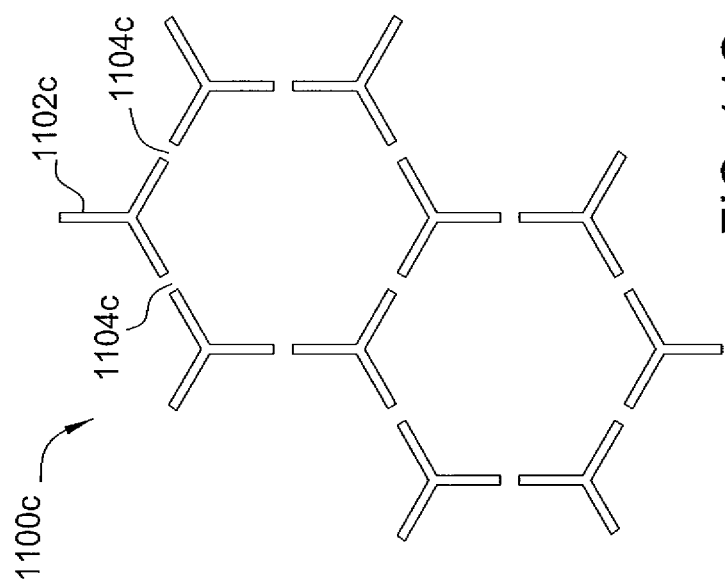
FIGS. 11A-11C are schematic diagrams illustrating top views of various exemplary embodiments of clamping mechanisms employing joints, according to the present invention.
Figure 11A:
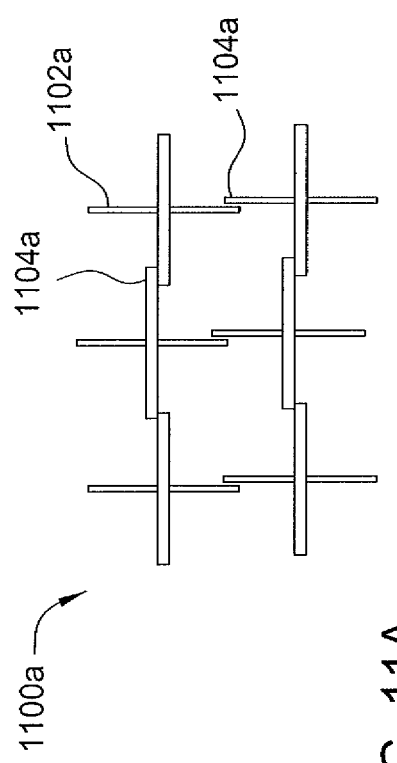
Figure 11B:
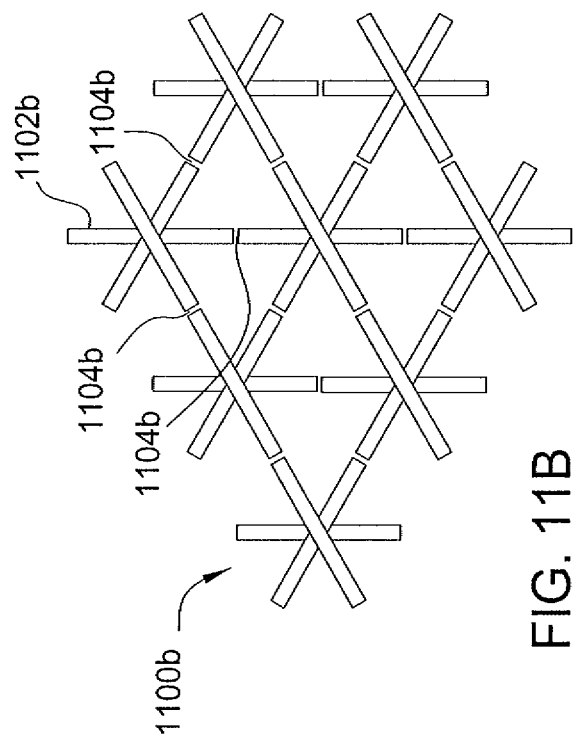

As discussed above, the clamping mechanisms deployed in the polymorphic layer may also comprise lockable joints, rather than movable locking posts or pins. FIGS. 11A-11C, for instance, are schematic diagrams illustrating top views of various exemplary embodiments of clamping mechanisms employing lockable joints, according to the present invention.

FIG. 11A, for example, illustrates a mesh 1100a of connectors or rigid bars 1102a, where the rigid bars 1102a meet each other at pivoting joints 1104a. Each rigid bar 1102a is coupled to at least two joints 1104a. For ease of illustration, only one rigid bar 1102a and two joints 1104a are indicated by reference numerals in FIG. 11A. Portions of the mesh 1100a may be locally raised and lowered by bending (rotation between the rigid bars 1102a) at the joints 1104a. Although FIG. 11A depicts a mesh whose apertures are substantially rectangular in shape and rigid bars 1102a that are substantially cross-shaped, other mesh and bar shapes are possible, as illustrated in FIGS. 11B-11C.

FIG. 11B, for example, illustrates a mesh 1100b whose apertures are substantially triangular in shape, formed of rigid bars 1102b that are substantially star-shaped. Each rigid bar 1102b is coupled to at least three joints 1104b.

FIG. 11C illustrates a mesh 1100c whose apertures are substantially hexagonal shape, formed of rigid bars 1102c that are substantially Y-shaped. Each rigid bar 1102c is coupled to at least two joints 1104c.

Although not illustrated, additional shapes for the mesh apertures and the rigid bars may be deployed without departing from the scope of the present invention.

Although the rigid bars 1102a-c illustrated in FIGS. 11A-11C are described as "rigid," in certain embodiments, the rigid bars 1102a-c may be formed of a material that offers a degree of flexibility. Alternatively, the degrees of freedom allowed by the lockable joints 1104a-1104c can be varied by varying the standoff distances in the joints 1104a-1104c or by maintaining a portion of the flexible or compliant fabric disposed above the meshes 1100a-1100c in a permanent, partially folded state.

In one embodiment, the joints 1104a-1104c include integral sensors that detect forced bending of the joints 1104a-1104c or stress.

Figure 12C:
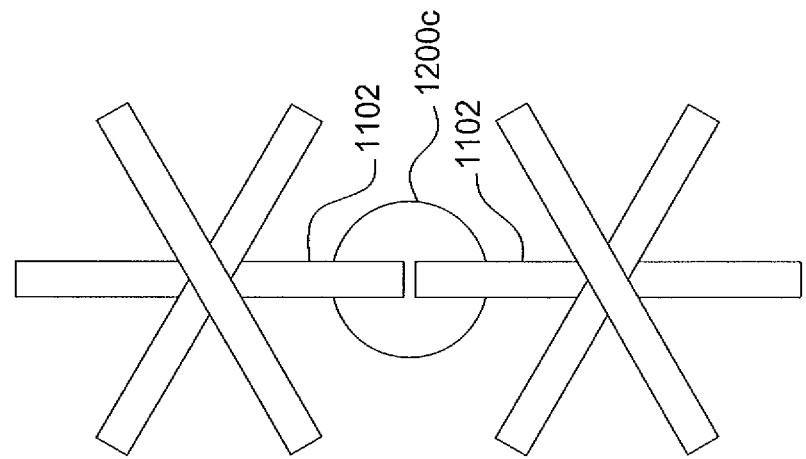
FIGS. 12A-12C are schematic diagrams illustrating various embodiments of locking mechanisms that may be employed to selectively lock the flexible joints illustrated in FIGS. 11A-11C.
Figure 12B:
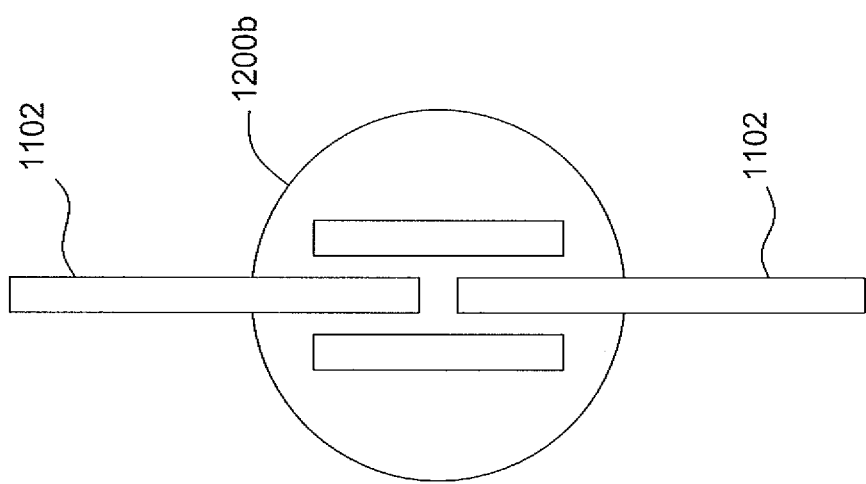
Figure 12A:
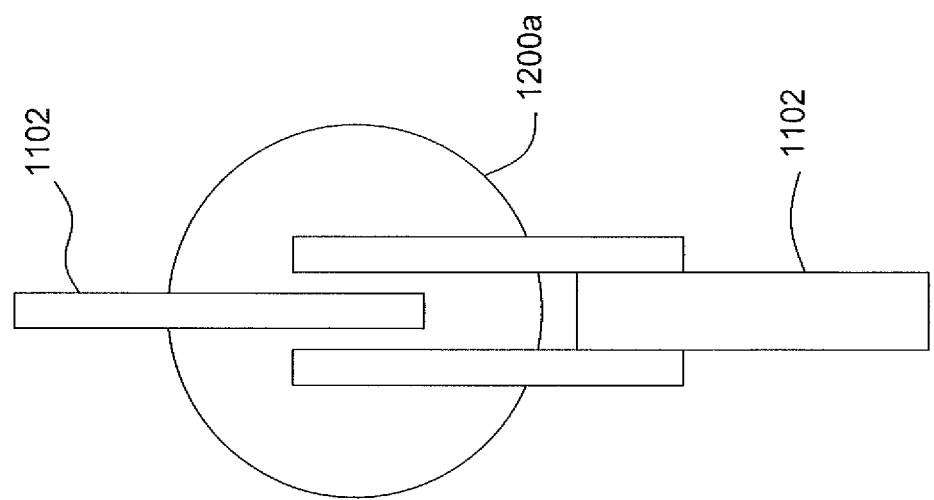

FIGS. 12A-12C are schematic diagrams illustrating various embodiments of locking mechanisms that may be employed to selectively lock the lockable joints 1104a-c illustrated in FIGS. 11A-11C. FIG. 12A, for instance, illustrates a fork-like locking mechanism 1200a; FIG. 12B illustrates an "earmuff"-like locking mechanism 1200b; and FIG. C illustrates a direct bar-to-bar locking mechanism 1200c. Any of the locking mechanisms 1200a-1200c may be strengthened using retaining pins (not shown) to secure the rigid bars 1102 to the locking mechanisms 1200a-1200c. However, it is important that the joints allow for not just bending, but also some lateral motion (i.e., the bars 1102a should be able to move closer and farther apart). This motion allows the bending of the joints to achieve the desired arbitrary surface shape. Locking at the joints may be achieved, for example, by clamping the bars 1102 to each other or to the locking plates 1200. Clamping may be by electrostatic attraction or by any of the other means described above.

Figure 13:
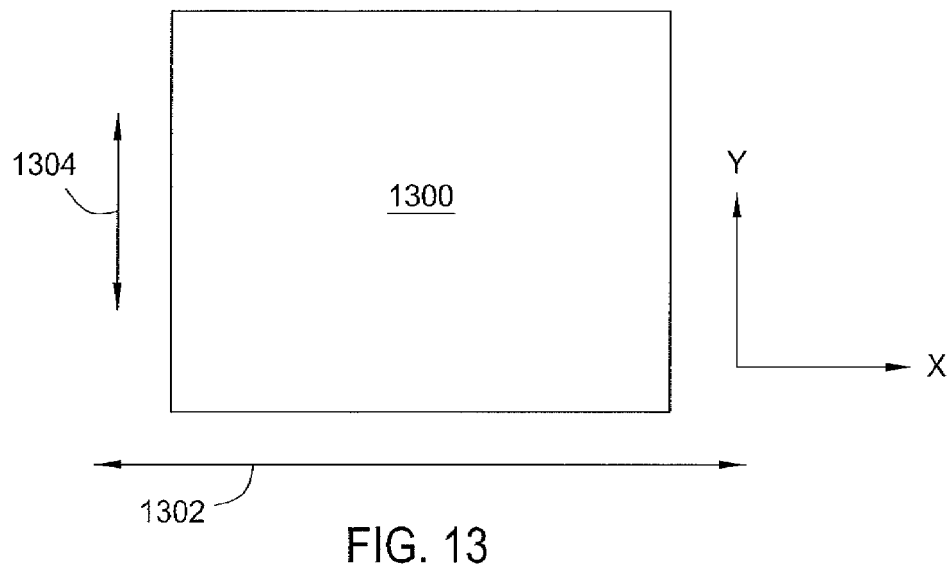
FIG. 13 illustrates one embodiment of a piece of flexible or compliant fabric.

As discussed above, the polymorphic layer 102 may also comprise a plurality of layers of a flexible corrugated or laminar plastic or compliant fabric. FIG. 13, for example, illustrates one embodiment of a piece 1300 of flexible or compliant fabric. As illustrated by the arrows 1302 and 1304, the fabric stretches more in one direction (e.g., the x direction) than it does in another direction (e.g., the y direction). A plurality of layers of such a fabric may be arranged and selectively clamped together in selected regions. By clamping two orthogonally compliant fabric layers together, the resulting fabric stack is made to be more rigid (non-stretchable) in the area where clamping is enabled. In another embodiment, at least three layers of plastic or fabric are arranged at substantially triangular or hexagonal positions relative to each other. In further embodiments, additional layers of fabric and arrangements are possible.

Figure 14:
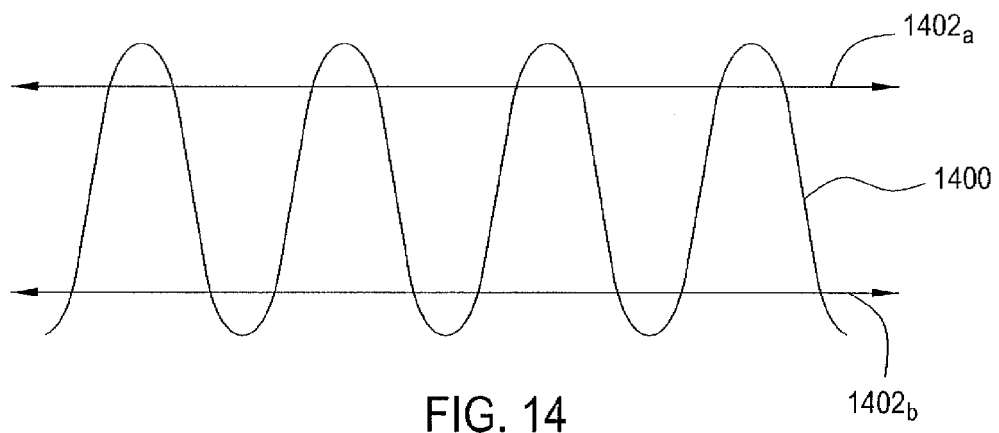
FIG. 14 illustrates one embodiment, of an accordion folded fabric that may be deployed above any of the clamping mechanisms discussed herein.

In one embodiment, the fabric takes on a corrugated or accordion folded shape in the direction in which it stretches more. That is, the fabric takes on the accordion folded shape when at rest. When force is exerted on one or more ends of the fabric, the accordion folded shape is flattened, and the fabric stretches. FIG. 14, for example, illustrates one embodiment, of an accordion folded fabric 1400 that may be deployed above any of the clamping mechanisms discussed herein. As illustrated, the accordion folded fabric 1400 is supported by one or more elastic bands 1402a-1402b that pull the accordion folded fabric 1400 in a direction that relaxes the accordion folds.

Figure 15:
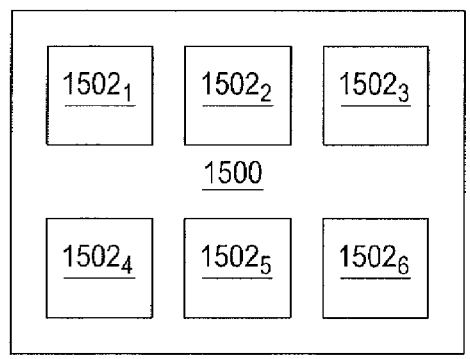
FIG. 15 illustrates another embodiment of a multi-layered fabric that may be deployed above any of the clamping mechanisms discussed herein.

In yet another embodiment, multiple layers of fabric may be arranged to form addressable clamping regions. FIG. 15, for example, illustrates another embodiment of a multi-layered fabric that may be deployed above any of the clamping mechanisms discussed herein. As illustrated, a first layer 1500 of fabric has a plurality of addressable clamping regions $1502_1$-$1502_n$ (hereinafter collectively referred to as "addressable clamping regions 1502") formed thereon. A similarly-formed second layer of fabric (not shown) may be layered on top of the first layer 1500, but rotated approximately ninety degrees (such that the first layer 1500 stretches more in a first direction, while the second layer stretches more in a second direction that is substantially orthogonal to the first direction). A third layer of fabric may be positioned between the first layer 1500 and the second layer. To achieve electrostatic clamping, the third layer of fabric is then raised to a voltage potential compared to the first layer 1500 and the second layer. Thus, the clamping occurs between third (middle) layer and the first layer 1500, and between the third layer and the second layer. Thus, the third layer effectively forms a tension wire or non-extensible fabric. In order to maintain this voltage potential, the fabric layers must include a conductive electrode layer. Any one of two adjacent fabric layers must also include a dielectric layer that insulates the adjacent electrodes from each other.

Alternatively, the addressable clamping regions 1502 may be formed of addressable, chargeable conductors that are "sewn" into the first layer 1500 (where at least the second layer is formed similarly). The chargeable conductors may be, for example, electrically chargeable by applying a voltage differential between two conductors. The layers can then be clamped in discrete regions whenever a positively charged addressable clamping region 1502 on the first layer is positioned above a negatively charged addressable clamping region on the second layer. If the portions of the first layer 1500 that do not comprise the addressable clamping regions 1502 are capable of significant stretching, then, since slippage can occur between the layers, the unclamped assembly of layers will be very flexible; alternatively, when clamped, the assembly of layers will be very rigid.

Figure 16:
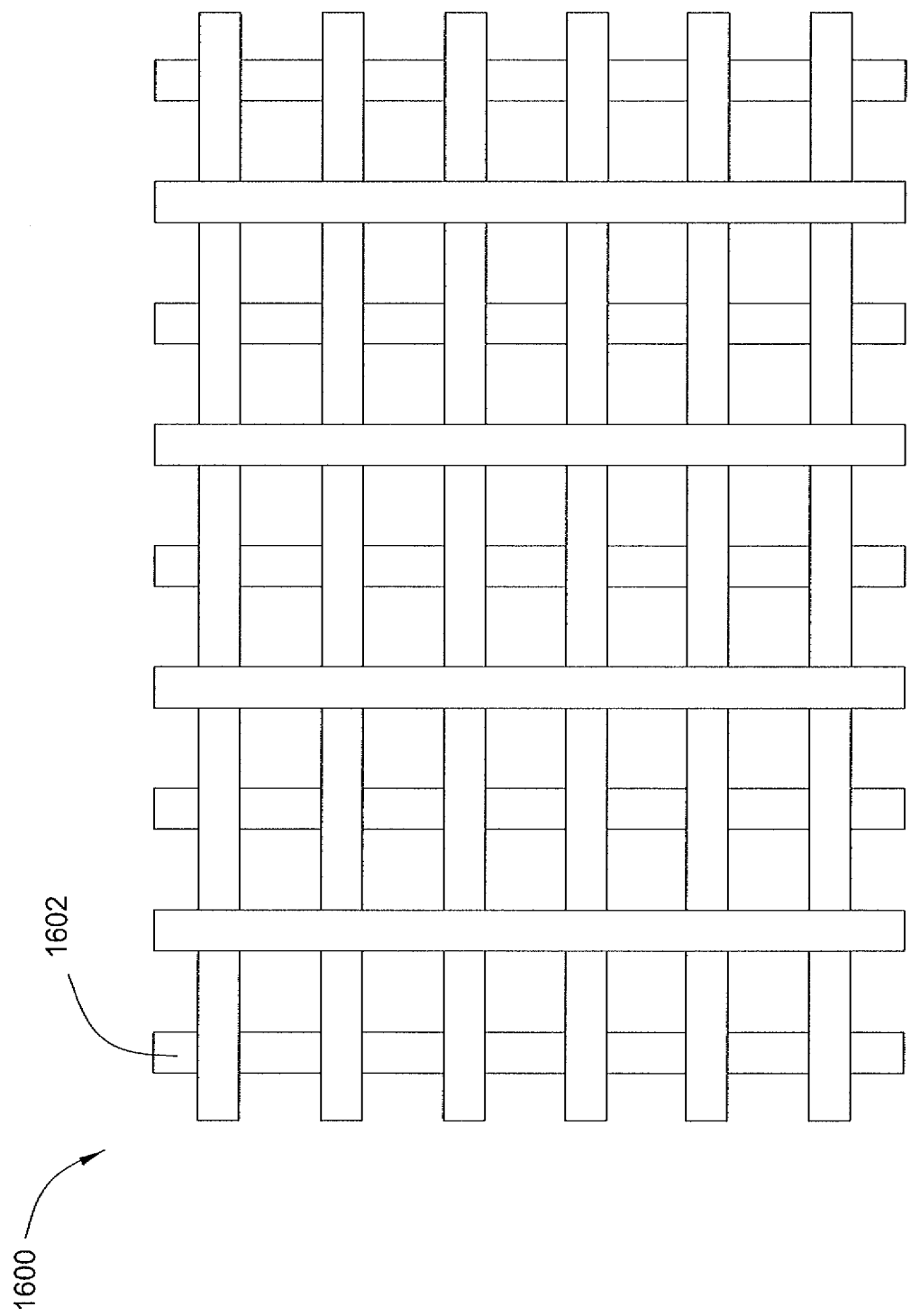
FIG. 16 illustrates another embodiment of a multi-layered fabric that may be deployed above any of the clamping mechanisms discussed herein.

FIG. 16 illustrates another embodiment of a multi-layered fabric that may be deployed above any of the clamping mechanisms discussed herein. Specifically, FIG. 16 illustrates an array 1600 of interwoven ribbons 1602. For ease of illustration, only one of the ribbons 1602 is indicated by a reference numeral in FIG. 16. The ribbons 1602 are free to slide relative to each other in the unclamped state. The ribbons 1602 may be clamped together at the locations at which they cross and thereby make the resulting structure rigid in the vicinity of the clamping. In one embodiment, the ribbons 1602 are substantially flat. In one embodiment, the ribbons 1602 are formed of a meta-material, for example as described in U.S. Pat. No. 7,598,651, such that the ribbons 1602 may be stiff or floppy. Although FIG. 16 illustrates an array 1600 in which the ribbons 1602 are woven in two directions, the ribbons may be woven in additional directions (e.g., three or more) to increase strength.

In addition to the embodiments illustrated in FIGS. 11-16, other embodiments of shape lockable surfaces are possible. The above-referenced U.S. Pat. No. 7,598,651, for example, describes several such embodiments. The embodiments described herein are merely illustrative of how shape lockable surfaces in general may be incorporated into a polymorphic display structure.

Figure 17:
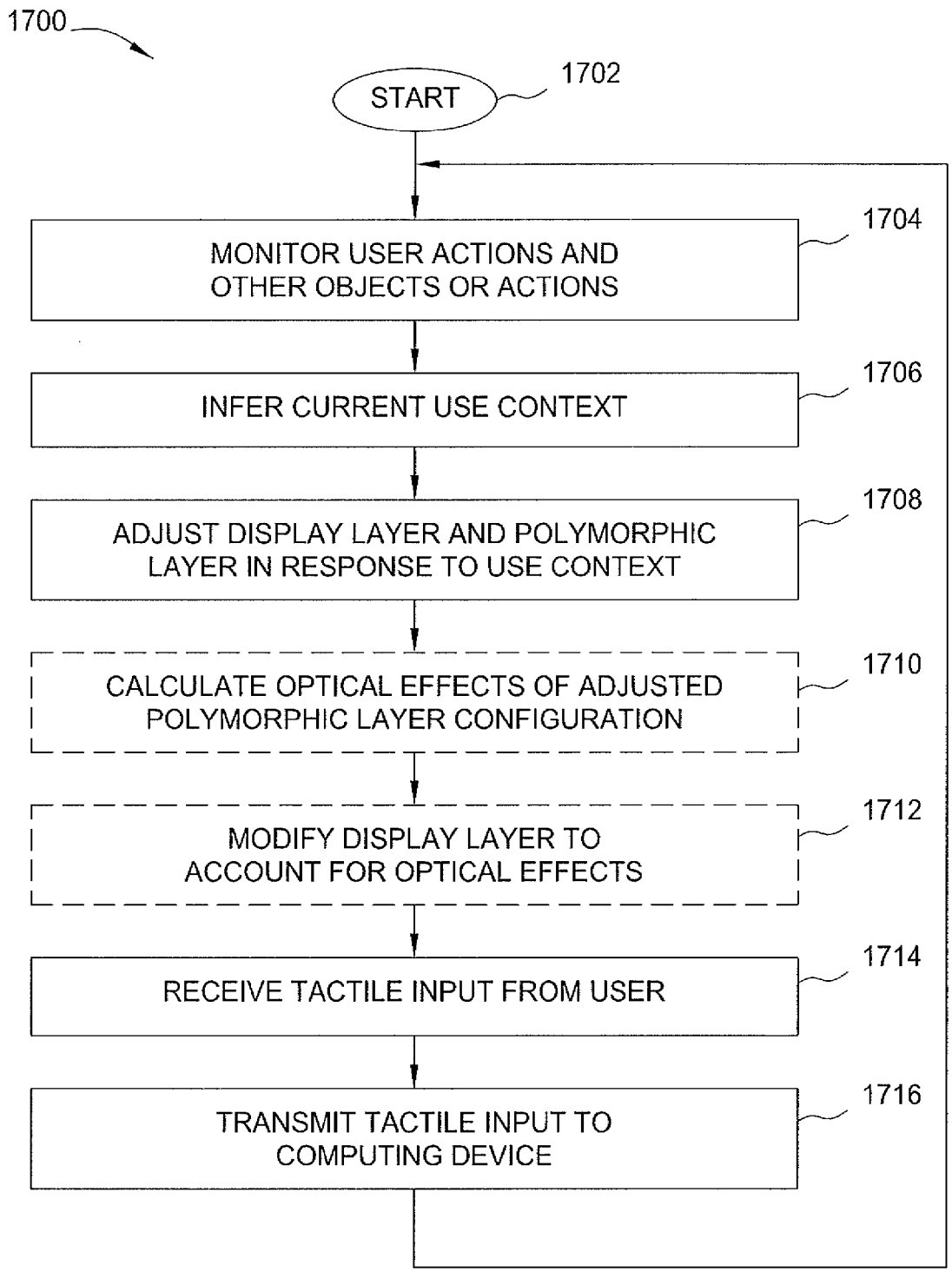
FIG. 17 is a flow diagram illustrating one embodiment of a method for interacting with a user of a computing system, according to the present invention.

FIG. 17 is a flow diagram illustrating one embodiment of a method 1700 for interacting with a user of a computing system, according to the present invention. The method 1700 may be implemented, for example, by any embodiment of the hardware device illustrated in FIGS. 1-16. As such, reference is made in the discussion of the method 1700 to various elements of the device 100. It will be appreciated, however, that the method 1700 is not limited to implementation with a device configured exactly as illustrated in FIG. 1. That is, the method 1700 may be implemented in hardware devices having configurations that differ from that illustrated in FIG. 1.

The method 1700 is initialized in step 1702 and proceeds to step 1704, where the observation layer 106 monitors the user's actions and other objects or actions at a distance from the display, preferably including the objects' or actions' proximity to the display surface. In one embodiment, the user actions that are monitored include the user's hand positions and gestures (which may include gestures other than hand gestures). In further embodiments, the user's gaze may be tracked by sensors, such as by tracking the direction of the user's nose and/or by following the user's eyes. These actions may be directly monitored by the sensors embedded in the observation layer 106. In one embodiment, relevant computing device display parameters that are taken into account include the current active applications, the currently active input fields associated with the currently active applications, and the display configuration (e.g., single monitor versus multiple monitors). These parameters may be directly monitored by the sensors embedded in the observation layer 106 and/or may be transmitted directly from the computing system 108.

In step 1706, the observation layer 106 is utilized to infer a current use context from the monitored information. For example, if a currently active input field visible of the computing device display includes a plurality of free form fields, and if the observation layer 106 detects that the user's hands are currently positioned as if to type, then the system may infer that the current use context involves the user typing some sort of free form text. The ability to make such inferences may be learned over time as the hardware device 100 adapts to the user. Additionally, the use context may be determined by the computing system 108 based on other factors, including the state of applications currently being executed and interacted with by the user.

In step 1708, the polymorphic layer 102 and the display layer 104 adjust in response to the inferred use context. For example, continuing the example above, if the current use context involves the user typing some sort of free form text, the polymorphic layer 102 may dynamically adjust its configuration (e.g., by adjusting the configuration of the grid elements, joints, and/or compliant fabric) such that a portion of the display layer 104 takes the shape of a standard keyboard, preferably at a convenient location based upon factors such as the positioning of the user's hands and/or the focus of the user's gaze. Additionally, in some embodiments, the keyboard may be further configured for the user's chosen language, layout, design, ergonomic factors, colors, sensitivity, and the like. Thus, a deformation is created in the interaction surface. For example, continuing the example above, if the current use context involves the user typing some sort of free form text, the polymorphic layer 102 might be configured as a set of alphanumeric keyboard keys.

In an alternative embodiment of steps 1706-1708, the user interactively requests or selects a desired user interface device, and the polymorphic layer 102 adapts in response to provide the desired user interface device. For example, the user might gesture with typing hands to request a keyboard. In this case, the observation layer 106 would receive the gesture, and in response the polymorphic layer 102 would deform to provide a keyboard. Alternatively, the user might gesture or otherwise enter a command to provide a user interface device menu (i.e., an interactive menu from which the user can select from choices like "keyboard," "joystick," and the like). The polymorphic layer 102 will then deform to provide the selected user interface device.

In optional step 1710 (illustrated in phantom), the observation layer 106 calculates the optical effects of the adjusted polymorphic layer configuration. In some cases, adjustment of the polymorphic layer 102 in step 1708 may optically distort the appearance of the underlying display layer 104. In such cases, it may be beneficial to compensate for these distortions so that the display layer 104 appears as intended. In one embodiment, the optical effects are calculated accounting for the inferred or measured position of the user's eyes relative to the display layer 104, and in step 1712, the display is modified accordingly to produce the desired effect by the viewer. This effectively reverses some or all of the optical distortion that is introduced by the initial adjustment of the polymorphic layer 102 in step 1708. In alternative embodiments, as previously discussed, where the display surface is not positioned beneath the polymorphic layer 102, optical distortion of this nature is not an issue.

In step 1714, the polymorphic layer 102 receives tactile input from the user. For example, continuing the example above, the tactile input may include the press of several buttons on a conventional keyboard configuration to spell out one or more words. In another embodiment, the tactile input may include the molding of the polymorphic layer 102 into a three-dimensional shape. In step 1716, the observation layer 106 transmits the input (e.g., the one or more words) to the computing system 108 for further processing. In one embodiment, the transmission of the input may also involve making corrections to the input (e.g., over time, the hardware device 100 may learn common input errors that the user tends to make). The method 1700 then returns to step 1704 and continues to monitor the user's actions and the display parameters so that the hardware device 100 continuously and dynamically adapts to changing use contexts.

Thus, the user does not have to change the position of his fingers on the hardware device 100. Instead, the hardware device 100 detects the locations of the user's fingers and responsively positions the appropriate user interfaces and interaction models.

Figure 18:
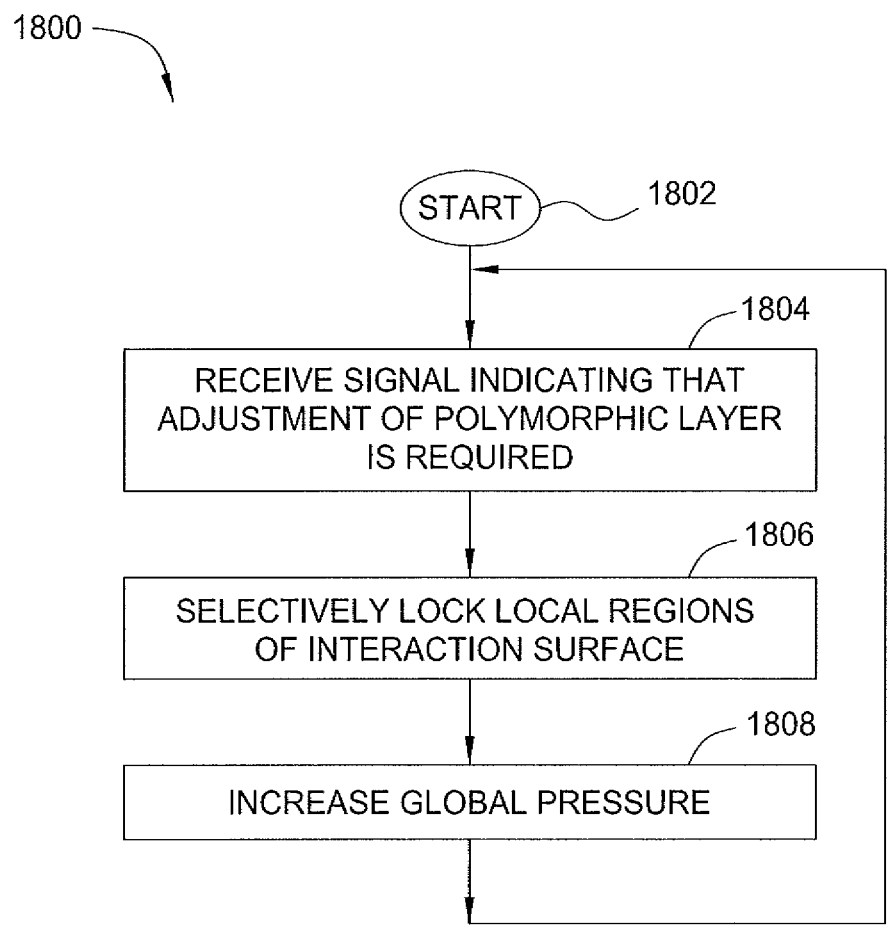
FIG. 18 is a flow diagram illustrating one embodiment of a method for adjusting the polymorphic layer of the hardware device.

FIG. 18 is a flow diagram illustrating one embodiment of a method 1800 for adjusting the polymorphic layer 102 of the hardware device 100. Thus, the method 1800 may be implemented in accordance with step 1710 of the method 1700. Although reference is made to various elements of FIGS. 1-16, it will be appreciated that the method 1800 is not limited to implementation with a device configured exactly as illustrated in FIGS. 1-16.

The method 1800 is initialized at step 1802 and proceeds to step 1804, where the polymorphic layer 102 receives a signal indicating that the configuration of the polymorphic layer 102 should be adjusted. For example, the signal might indicate that the polymorphic layer 102 should be configured as an alphanumeric keyboard. In one embodiment, the signal is received from the computing system to which the hardware device 100 is coupled.

In step 1806, the clamping mechanism (e.g., electrostatic latches, locking pins, lockable joints, layered fabrics, or any of the other embodiments described above) selectively locks one or more local regions of the polymorphic layer's interaction surface. In particular, the portions of the clamping mechanism that control the one or more regions of the interaction surface are locked. In one embodiment, these regions of the interaction surface are locked in a downward (not raised) position. In another embodiment, these regions of the interaction surface are locked in a raised position. The specific regions of the interaction surface that are locked, as well as the position in which the regions are locked, will depend on the current configuration of the polymorphic layer 102 and the desired configuration of the polymorphic layer 102 as indicated by the signal received in step 1804. Thus, the locked and un-locked regions of the interaction surface are dynamically defined responsive to the received signals.

In step 1808, the global pressure is increased (e.g., by activating the actuator). This will cause upward or outward motion of any regions of the interaction surface that have not been selectively locked in step 1806. The result is an interaction surface having the three-dimensional shape and feel of a desired input device (or other interactive shape). If more than one gradation in upward or downward motion is desired, then the actuation can be varied to change the global pressure in concert with selective locking. In this case, a region that is locked only when the upward pressure achieves a certain level would have a greater motion than a region that is locked at a lower pressure, for example.

The method 1800 then returns to step 1804 and awaits a next signal to adjust the configuration of the polymorphic layer 102.

In some embodiments, the hardware device 100 may be specifically trained for cognitive and motion models associated with neurological and nervous system disorders such as Parkinson's disease, multiple sclerosis, Alzheimer's disease, and the like. This will enable dynamic correction of inputs resulting from jittery movements and support easier cross-application automation.

Further extensions of the hardware device 100 include use with dual screen displays and dual graphics processing units (GPUs). For example, one GPU may be used to accelerate the graphics output of the other GPU or to accelerate the streaming cores to real time process gestures and interactions.

Still further extensions of the hardware device 100 allow any interface to be changed into another. This capability may prove useful in combat situations or in driving emergencies, among other scenarios. For instance, rather than bring several different devices into such scenarios, it may only be necessary to bring one device (e.g., the hardware device 100) that can transform into several different devices. For example, a single device could transform from an alphanumeric keypad for a cellular telephone to a global positioning system (GPS) unit interface to a controller for a small robot. The device could transform based on its proximity to certain objects. For example, an adaptive device in accordance with the present invention could be used to interact with a bank automatic teller machine (ATM). In further embodiments, the hardware device 100 could be used for musical or artistic instruction (e.g., where the hardware device 100 transforms into an interface that simulates a piano, a set of drums, a finger painting surface, a potter's wheel, or the like).

Figure 19:
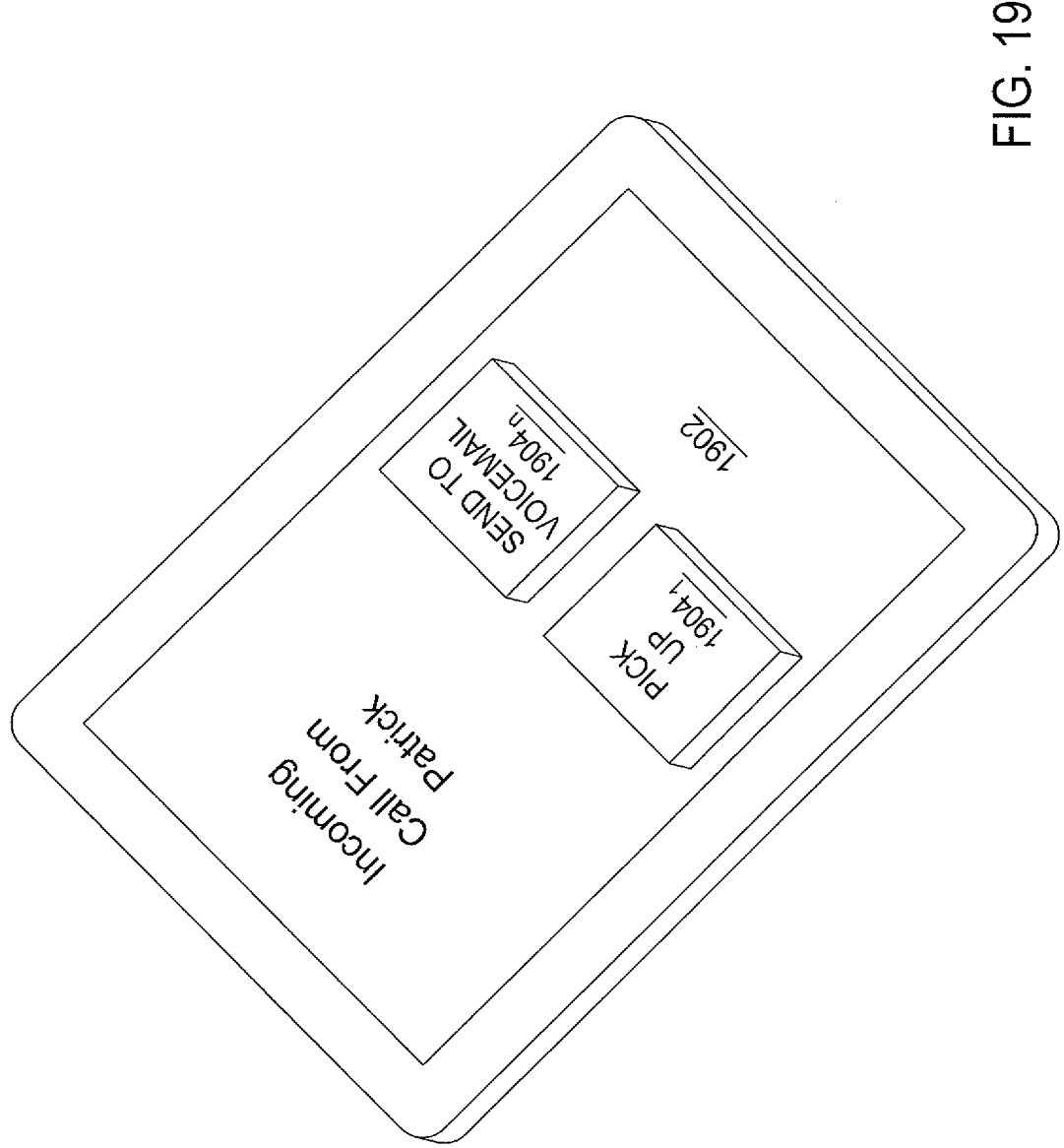
FIG. 19 illustrates a cellular telephone having an integrated hardware device such as the hardware device illustrated in FIG. 1.

In further extensions, the hardware device 100 is integrated in a cellular telephone. FIG. 19, for example, illustrates a cellular telephone 1900 having an integrated hardware device such as the hardware device 100 illustrated in FIG. 1. In the instance of FIG. 19, the polymorphic layer of the hardware device may comprise, for example, a layer of material that can be electronically controlled in selective areas. For example, electrostatic clamping may be used to stiffen selected areas of the material, such as the area designated 1902 in FIG. 19. Force may be applied beneath the layer of material (e.g., using pumped fluid or gas, electronic drivers, or other actuation means including those discussed above, such as with reference to FIG. 10) which results in the raising or lowering of tactile bumps $1904_1$-$1904_n$ in areas where the layer of material is not stiffened. Alternatively, the entire layer of material (or a majority of the layer of material) can be stiffened in a raised, lowered, or neutral state to produce a single button or shape. Thus, the hardware device can be transformed into an interface that allows substantially any type of cellular telephone interaction, including keyboard typing, scrolling, shrinking, or the like.

A hardware device integrated in a cellular telephone would allow a user to control the telephone simply by touch. Unlike conventional touch screen interfaces, however, the hardware device additionally provides tactile feedback (to the single fingertip level) that allows the user to control the cellular telephone without having to constantly look at the telephone's screen.

Figure 20:
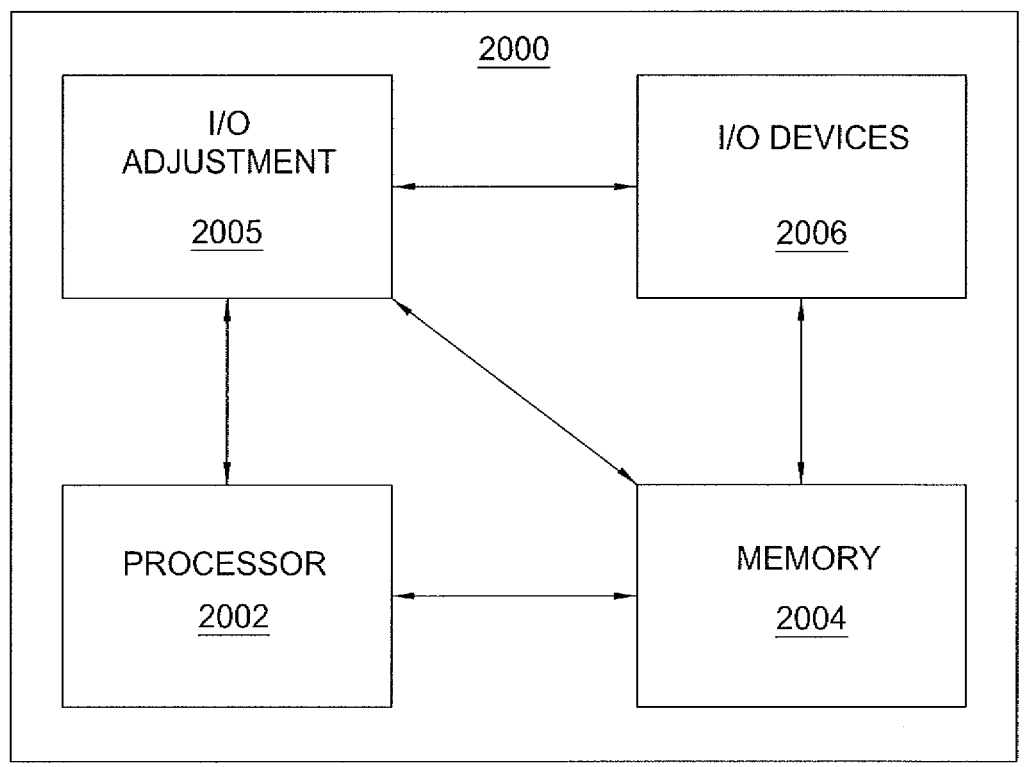
FIG. 20 is a high level block diagram of the present invention implemented using a general purpose computing device.

FIG. 20 is a high level block diagram of the present invention implemented using a general purpose computing device 2000. It should be understood that embodiments of the invention can be implemented as a physical device or subsystem that is coupled to a processor through a communication channel. Therefore, in one embodiment, a general purpose computing device 2000 comprises a processor 2002, a memory 2004, an input/output (I/O) adjustment module 2005, and various input/output (I/O) devices 2006 such as a display, a keyboard, a mouse, a modem, a microphone, speakers, a touch screen, an adaptable I/O device, and the like. In one embodiment, at least one I/O device is a storage device (e.g., a disk drive, an optical disk drive, a floppy disk drive).

Alternatively, embodiments of the present invention (e.g., I/O adjustment module 2005) can be represented by one or more software applications (or even a combination of software and hardware, e.g., using Application Specific Integrated Circuits (ASIC)), where the software is loaded from a storage medium (e.g., I/O devices 2006) and operated by the processor 2002 in the memory 2004 of the general purpose computing device 2000. Thus, in one embodiment, the I/O adjustment module 2005 for adjusting an adaptable I/O device described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A hardware device for facilitating an interaction between a computing system and a user, the hardware device comprising:
  an interaction surface for supporting the interaction;
  a single actuator capable of driving a first region of the interaction surface; and
  a first selective clamping mechanism capable of restricting movement of one or more second regions of the interaction surface that are coplanar with the first region and that partly intersect the first region, the restricting at least partially counteracting an effect of the actuator on a portion of the one or more second regions,
  wherein a displacement of one or more desired portions of the interaction surface is dynamically controllable.

2. The hardware device of claim 1, wherein the actuator is capable of driving the first region in a direction substantially normal to the interaction surface, and wherein the displacement is substantially normal to the interaction surface.

3. The hardware device of claim 1, wherein the displacement of the desired portions equals one or more distances dynamically selected from among a plurality of non-zero distances.

4. The hardware device of claim 1, wherein the displacement is reversible in response to a user-exerted force.

5. The hardware device of claim 4, wherein the user-exerted force is a press, and the displacement is gradually reversible in response to the press.

6. The hardware device of claim 4, wherein a resistance of the one or more desired portions to the user-exerted force is variable.

7. The hardware device of claim 1, further comprising:
  a controllable ratcheting mechanism.

8. The hardware device of claim 1, wherein the first region comprises substantially an entirety of the interaction surface.

9. The hardware device of claim 1, wherein each of the one or more second regions is dynamically defined.

10. The hardware device of claim 1, further comprising:
  a second selective clamping mechanism capable of dynamically clamping together a plurality of selected elements of the interaction surface so that the plurality of selected elements moves as a group.

11. The hardware device of claim 1, wherein the interaction surface comprises:
  an array of elements organized into a plurality of rows and a plurality of columns, such that the plurality of rows intersects the plurality of columns,
  wherein a first one of the actuator and the first selective clamping mechanism operates on a selected one or more of the plurality of rows, and a second one of the actuator and the first selective clamping mechanism operates on a selected one or more of the plurality of columns.

12. The hardware device of claim 1, wherein:
the interaction surface comprises a plurality of pivoting joints and a plurality of connectors between the plurality of pivoting joints; and
the first selective clamping mechanism is capable of restricting a movement of those of the plurality of pivoting joints that are associated with the one or more second regions.

13. The hardware device of claim 1, wherein:
the interaction surface comprises a compliant layer; and
the first selective clamping mechanism is capable of restricting a compliance of the compliant layer within the one or more second regions.

14. The hardware device of claim 1, wherein the first selective clamping mechanism comprises an electrically controllable clamping mechanism.

15. The hardware device of claim 14, wherein the first selective clamping mechanism comprises electrostatic clamping.

16. The hardware device of claim 1, wherein the first selective clamping mechanism includes a clamping mechanism selected from one or more of: electrochemically controlled clamping, electrothermally controlled clamping, electromagnetic clamping, mechanical clamping, ferrofluids, and electrorheological fluids.

17. The hardware device of claim 1, wherein the first selective clamping mechanism comprises:
a plurality of individually controllable latches corresponding to a plurality of individually controllable elements of the interaction surface.

18. The hardware device of claim 1, wherein the first selective clamping mechanism is substantially transparent.

19. The hardware device of claim 1, wherein the interaction surface displays a visual output to the user under a control of the computing system.

20. The hardware device of claim 1, wherein the actuator and the first selective clamping mechanism are controllable by the computing system, and the displacement is thereby dynamically controllable.

21. The hardware device of claim 1, wherein an input signal is transmitted to the computing system in response to a physical manipulation by the user of the one or more desired portions after a displacement of the one or more desired portions is caused.

22. The hardware device of claim 21, wherein the physical manipulation includes one or more of: pressing or touching.

23. The hardware device of claim 22, wherein the one or more desired portions function as one or more input devices selected from: an alphanumeric keyboard, a telephone-style keypad, a numeric keypad, a media player controller, a joystick, a video game controller, a television-style remote controller, a vehicle controller, or a robot controller.

24. The hardware device of claim 22, wherein the one or more desired portions function as an interactive command for a window displayed on the interaction surface, the interactive command comprising one or more of: close the window, minimize the window, or scroll a content of the window.

25. The hardware device of claim 22, wherein the one or more desired portions represent a topographic terrain map.

26. The hardware device of claim 21, wherein the physical manipulation comprises molding the one or more desired portions into a three-dimensional shape.

27. The hardware device of claim 1, wherein the interaction surface has a substantially non-planar shape in an absence of the displacement.

28. The hardware device of claim 1, wherein a shape of the displacement resembles a human head, a human hand, or a human face.

29. A method for facilitating an interaction between a computing system and a user via an interaction surface, the method comprising:
driving a first region of the interaction surface, using a single actuator; and
restricting movement of one or more second regions of the interaction surface that are coplanar with the first region and that partly intersect the first region, using a first selective clamping mechanism, the restricting at least partially counteracting an effect of the actuator on a portion of the one or more second regions,
wherein a displacement of one or more desired portions of the interaction surface is dynamically controllable.

30. A computer readable storage device containing an executable program for facilitating an interaction between a computing system and a user via an interaction surface, where the program performs steps of:
driving a first region of the interaction surface, using a single actuator; and
restricting movement of one or more second regions of the interaction surface that are coplanar with the first region and that partly intersect the first region, using a first selective clamping mechanism, the restricting at least partially counteracting an effect of the actuator on a portion of the one or more second regions,
wherein a displacement of one or more desired portions of the interaction surface is dynamically controllable.

31. A hardware device for facilitating an interaction between a computing system and a user, the hardware device comprising:
an adaptable surface for supporting the interaction, the adaptable surface being dynamically deformable under a control of the computing system so as to produce a deformation in a given region of the adaptable surface;
a controllable clamping mechanism capable of dynamically varying a resistance of the deformation in the given region of the adaptable surface to movement in response to a pressure applied by the user; and
circuitry for transmitting an input signal to the computing system responsive to the pressure.

32. The hardware device of claim 31, wherein the deformation substantially mimics an appearance and a pressure response associated with one or more input devices.

33. The hardware device of claim 32, wherein the one or more input devices comprises at least one of: a key, a button, or a joystick.

34. The hardware device of claim 31, wherein the adaptable surface further comprises:
a viewing surface that displays visual output under a control of the computing system.

35. The hardware device of claim 34, wherein at least the deformation comprises a substantially transparent material.

36. The hardware device of claim 34, wherein the adaptable surface comprises one or more display elements positioned on top of the deformation.

37. A method for facilitating an interaction between a computing system and a user via an adaptable surface, the method comprising:
dynamically deforming the adaptable surface under a control of the computing system so as to produce a deformation in a given region of the adaptable surface;
dynamically varying a resistance of the deformation in the given region of the adaptable surface to movement in response to a pressure applied by the user, using a controllable clamping mechanism; and transmitting an input signal to the computing system responsive to the pressure.

38. The method of claim 37, wherein the deforming is performed in response to a request from the user.

39. The method of claim 38, wherein the request indicates a desired type of user interface device for use in providing the input signal.

40. A computer readable storage device containing an executable program for facilitating an interaction between a computing system and a user via an adaptable surface, where the program performs steps of:

dynamically deforming the adaptable surface under a control of the computing system so as to produce a deformation in a given region of the adaptable surface;

dynamically varying a resistance of the deformation in the given region of the adaptable surface to movement in response to a pressure applied by the user, using a controllable clamping mechanism; and transmitting an input signal to the computing system responsive to the pressure.

41. A hardware display device for facilitating an interaction between a computing system and a user, the hardware display device comprising:

an adaptable surface for supporting the interaction, the adaptable surface being dynamically deformable under a control of the computing system so as to produce a deformation that substantially mimics an appearance associated with an input device, wherein the deformation is further deformable under a user-applied pressure to assume a shape and a pressure response that substantially mimics the input device when pressed;

a viewing surface that displays visual output under a control of the computing system, wherein the visual output is dynamically configurable to display a visual appearance that substantially mimics the input device; and circuitry for transmitting an input signal to the computing system in response to the user-applied pressure.

42. The hardware display device of claim 41, wherein the deformation substantially mimics an appearance associated with one or more input devices.

43. The hardware display device of claim 42, wherein the one or more input devices comprises at least one of: a key, a button, or a joystick.

44. The hardware display device of claim 41, wherein the adaptable surface further comprises:

a viewing surface that displays visual output under a control of the computing system.

45. The hardware display device of claim 44, wherein at least the deformation comprises a substantially transparent material.

46. The hardware display device of claim 43, wherein the adaptable surface comprises one or more display elements positioned on top of the deformation.

* * * * *